US009135910B2

(12) United States Patent
Tamura et al.

(10) Patent No.: US 9,135,910 B2
(45) Date of Patent: Sep. 15, 2015

(54) SPEECH SYNTHESIS DEVICE, SPEECH SYNTHESIS METHOD, AND COMPUTER PROGRAM PRODUCT

(71) Applicant: KABUSHIKI KAISHA TOSHIBA, Minato-ku, Tokyo (JP)

(72) Inventors: Masatsune Tamura, Kanagawa (JP); Masahiro Morita, Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 263 days.

(21) Appl. No.: 13/765,012

(22) Filed: Feb. 12, 2013

(65) Prior Publication Data

US 2013/0218568 A1 Aug. 22, 2013

(30) Foreign Application Priority Data

Feb. 21, 2012 (JP) ................................ 2012-035520

(51) Int. Cl.

| | |
|---|---|
| ***G10L 13/00*** | (2006.01) |
| ***G10L 13/08*** | (2013.01) |
| ***G10L 13/06*** | (2013.01) |
| ***G10L 13/033*** | (2013.01) |
| *G10L 15/00* | (2013.01) |

(52) U.S. Cl.

CPC ............... *G10L 13/08* (2013.01); *G10L 13/033* (2013.01); *G10L 13/06* (2013.01)

(58) Field of Classification Search

CPC ......... G10L 13/04; G10L 13/06; G10L 13/08; G10L 13/033

USPC .......... 704/231, 239, 246, 258, 263, 269, 275

See application file for complete search history.

(56) References Cited

U.S. PATENT DOCUMENTS

| | | | |
|---|---|---|---|
| 6,463,412 | B1 | 10/2002 | Baumgartner et al. |
| 7,580,839 | B2 | 8/2009 | Tamura et al. |
| 7,668,717 | B2 | 2/2010 | Mizutani et al. |
| 2007/0168189 | A1 | 7/2007 | Tamura et al. |

FOREIGN PATENT DOCUMENTS

| | | | | |
|---|---|---|---|---|
| JP | 08-248994 | A | | 9/1996 |
| JP | 08248994 | A | * | 9/1996 |
| JP | 2007-025042 | A | | 2/2007 |
| JP | 2007025042 | A | * | 2/2007 |
| JP | 2007-193139 | A | | 8/2007 |
| JP | 2007193139 | A | * | 8/2007 |
| JP | 2011-053404 | A | | 3/2011 |

OTHER PUBLICATIONS

Office Action mailed on Apr. 22, 2014 in corresponding JP application No. 2012-035520 (with English Translation).
Office Action mailed Sep. 16, 2014 issued in corresponding JP patent application No. 2012-035520 (and English translation).
Background Art Information Sheet provided by applicants (Jul. 3, 2012) (1 page total).

* cited by examiner

*Primary Examiner* — Thierry L Pham
(74) *Attorney, Agent, or Firm* — Posz Law Group, PLC

(57) ABSTRACT

According to an embodiment, a speech synthesis device includes a first storage, a second storage, a first generator, a second generator, a third generator, and a fourth generator. The first storage is configured to store therein first information obtained from a target uttered voice. The second storage is configured to store therein second information obtained from an arbitrary uttered voice. The first generator is configured to generate third information by converting the second information so as to be close to a target voice quality or prosody. The second generator is configured to generate an information set including the first information and the third information. The third generator is configured to generate fourth information used to generate a synthesized speech, based on the information set. The fourth generator configured to generate the synthesized speech corresponding to input text using the fourth information.

16 Claims, 25 Drawing Sheets

| SPEECH UNIT NUMBER | SPEECH UNIT (PITCH MARK) | | | | |
|---|---|---|---|---|---|
| | PHONEME NAME | ADJACENT PHONEME NAME | FUNDAMENTAL FREQUENCY (Hz) | DURATION LENGTH (msec) | BOUNDARY SPECTRUM PARAMETER |
| 1 |  | | | | |
| | /a-LEFT/ | /SIL/ | 308.6 | 56.1 | $c_1(1), c_1(T)$ |
| 2 |  | | | | |
| | /a-LEFT/ | /SIL/ | 300.5 | 36.5 | $c_2(1), c_2(T)$ |
| 3 |  | | | | |
| | /a-LEFT/ | /SIL/ | 334.6 | 54.2 | $c_3(1), c_3(T)$ |
| ⋮ | ⋮ | | | | |

| | TARGET | | | CONVERSION SOURCE |
|---|---|---|---|---|
| | 1 SENTENCE | 10 SENTENCES | 50 SENTENCES | 600 SENTENCES |
| /a/ | 6 | 53 | 253 | 4410 |
| /i/ | 7 | 37 | 191 | 2985 |
| /u/ | 0 | 25 | 118 | 2497 |
| /n/ | 3 | 21 | 85 | 1601 |
| /m/ | 3 | 16 | 81 | 855 |
| /g/ | 0 | 7 | 40 | 708 |
| /z/ | 0 | 4 | 10 | 34 |
| /k/ | 0 | 22 | 134 | 2080 |
| /ch/ | 0 | 7 | 23 | 274 |
| /ki/ | 2 | 0 | 1 | 88 |
| ⋮ | ⋮ | ⋮ | ⋮ | ⋮ |

| FUNDAMENTAL FREQUENCY SEQUENCE NUMBER | FUNDAMENTAL FREQUENCY PATTERN (MORA BOUNDARY INFORMATION) | | | | |
|---|---|---|---|---|---|
| | MORA SEQUENCE | NUMBER OF MORAE | ACCENT TYPE | ACCENTUAL PHRASE TYPE | PART OF SPEECH |
| 1 |  | | | | |
| | /me/no/ma/e/no | 5 | 3 | BEGINNING OF SENTENCE | NOUN-POST-POSITION |
| 2 |  | | | | |
| | /ha/ma/be/o/ | 4 | 0 | MIDDLE OF SENTENCE | NOUN-POST-POSITION |
| 3 |  | | | | |
| | /sa/N/po/su/ru/ | 5 | 0 | END OF SENTENCE | VERB |
| ⋮ | ⋮ | | | | |

| | TARGET | | | CONVERSION SOURCE |
|---|---|---|---|---|
| | 1 SENTENCE | 10 SENTENCES | 50 SENTENCES | 600 SENTENCES |
| BEGINNING OF SENTENCE-2-1 | 0 | 1 | 1 | 16 |
| BEGINNING OF SENTENCE-4-0 | 0 | 0 | 7 | 50 |
| BEGINNING OF SENTENCE-7-0 | 1 | 1 | 1 | 12 |
| MIDDLE OF SENTENCE-3-1 | 0 | 0 | 4 | 119 |
| MIDDLE OF SENTENCE-4-0 | 1 | 2 | 9 | 178 |
| MIDDLE OF SENTENCE-4-1 | 0 | 2 | 11 | 131 |
| MIDDLE OF SENTENCE-5-3 | 0 | 0 | 5 | 55 |
| END OF SENTENCE-4-0 | 0 | 3 | 12 | 62 |
| END OF SENTENCE-5-4 | 0 | 0 | 2 | 20 |
| END OF SENTENCE-6-4 | 1 | 2 | 5 | 18 |
| ⋮ | ⋮ | ⋮ | ⋮ | ⋮ |

| PHONEME DURATION LENGTH NUMBER | DURATION LENGTH (msec) | PHONEME NAME | LEFT ADJACENT PHONEME NAME | RIGHT ADJACENT PHONEME NAME | POSITION IN SENTENCE |
|---|---|---|---|---|---|
| 1 | 112.2 | /a/ | /SIL/ | /n/ | 0 |
| 2 | 73.0 | /a/ | /SIL/ | /sh/ | 0 |
| 3 | 108.4 | /a/ | /SIL/ | /i/ | 0 |
| ⋮ | ⋮ | ⋮ | ⋮ | ⋮ | ⋮ |

FIG.36

| FEATURE PARAMETER NUMBER | FEATURE PARAMETER | CONTEXT LABEL | PHONEME SEQUENCE | MORA NUMBER SEQUENCE | ACCENT TYPE SEQUENCE | ACCENTUAL PHRASE TYPE SEQUENCE |
|---|---|---|---|---|---|---|
| 1 | $O_1$ | $L_1$ | $phone_1$ | $nmorae_1$ | $accType_1$ | $accPhraseType_1$ |
| 2 | $O_2$ | $L_2$ | $phone_2$ | $nmorae_2$ | $accType_2$ | $accPhraseType_2$ |
| ⋮ | ⋮ | ⋮ | ⋮ | ⋮ | ⋮ | ⋮ |

SPEECH SYNTHESIS DEVICE, SPEECH SYNTHESIS METHOD, AND COMPUTER PROGRAM PRODUCT

CROSS-REFERENCE TO RELATED APPLICATIONS

This application is based upon and claims the benefit of priority from Japanese Patent Application No. 2012-035520, filed on Feb. 21, 2012; the entire contents of which are incorporated herein by reference.

FIELD

Embodiments described herein relate generally to a speech synthesis device, a speech synthesis method, and a computer program product.

BACKGROUND

A speech synthesis device has been known which generates a speech waveform from input text. The speech synthesis device generates synthesized speech corresponding to the input text mainly through a text analysis process, a prosody generation process, and a waveform generation process. As a speech synthesis method, there are speech synthesis based on unit selection and speech synthesis based on a statistical model.

In the speech synthesis based on unit selection, speech units are selected from a speech unit database and are then concatenated to generate a waveform. Furthermore, in order to improve stability, a plural-unit selection and fusion method is used, the method includes selecting a plurality of speech units for each synthesis unit, generating speech units from the plurality of selected speech units using, for example, a pitch-cycle waveform averaging method, and concatenating the speech units. As a prosody generating method, for example, the following methods may be used: a duration length generation method based on a sum-of-product model; and a fundamental frequency sequence generation method using a fundamental frequency pattern code book and offset prediction.

As the speech synthesis based on the statistical model, speech synthesis based on an HMM (hidden Markov model) has been proposed. In the speech synthesis based on the HMM, the HMM which corresponds to a synthesis unit is trained from a spectrum parameter sequence, a fundamental frequency sequence, or a band noise intensity sequence calculated from speech and parameters are generated from an output distribution sequence corresponding to input text. In this way, a waveform is generated. A dynamic feature value is added to the output distribution of the HMM, and a parameter generation algorithm considering the dynamic feature value is used to generate a speech parameter sequence. In this way, smoothly concatenated synthesized speech is obtained.

Converting the quality of an input voice into a target voice quality is referred to as voice conversion. The speech synthesis device can generate synthesized speech close to a target voice quality or prosody using the voice conversion. For example, it is possible to convert a large amount of voice data obtained from an arbitrary uttered voice so as to be close to the target voice quality or prosody using a small amount of voice data obtained from a target uttered voice and generate speech synthesis data used for speech synthesis from a large amount of converted voice data. In this case, when only a small amount of voice data is prepared as target voice data, it is possible to generate synthesized speech which reproduces the features of the target uttered voice.

However, in the speech synthesis device using conventional voice conversion, during speech synthesis, only voice data generated by the voice conversion is used, but voice data obtained from the target uttered voice is not used. Therefore, similarity to the target uttered voice is likely to be insufficient.

BRIEF DESCRIPTION OF THE DRAWINGS

FIG. 36 is a diagram illustrating an example of the feature parameter and attribute information;

DETAILED DESCRIPTION

According to an embodiment, a speech synthesis device includes a first storage, a second storage, a first generator, a second generator, a third generator, and a fourth generator. The first storage is configured to store therein first information obtained from a target uttered voice. The second storage is configured to store therein second information obtained from an arbitrary uttered voice. The first generator is configured to generate third information by converting the second information so as to be close to a target voice quality or prosody. The second generator is configured to generate an information set including the first information and the third information. The third generator is configured to generate fourth information used to generate a synthesized speech, based on the information set. The fourth generator configured to generate the synthesized speech corresponding to input text using the fourth information.

A speech synthesis device according to an embodiment generates speech synthesis data (fourth information) based on a voice data set (information set) including target voice data (first information) which is obtained from a target uttered voice and converted voice data (third information) which is obtained by converting conversion source voice data (second information) obtained from an arbitrary uttered voice to be close to target voice quality or prosody. Then, the speech synthesis device generates synthesized speech from input text using the obtained speech synthesis data.

Figure 1:
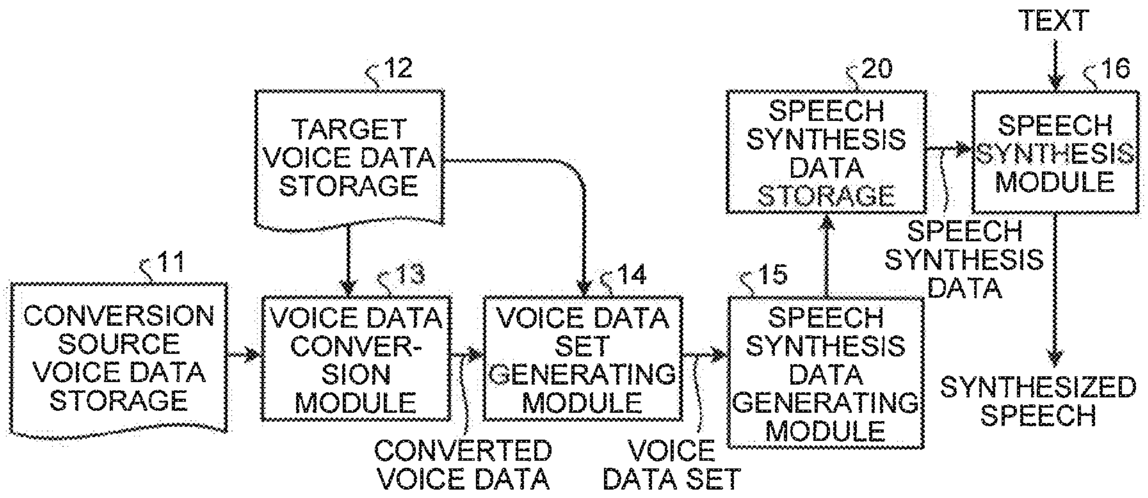
FIG. 1 is a block diagram illustrating a speech synthesis device according to an embodiment.

FIG. 1 is a block diagram illustrating the structure of the speech synthesis device according to this embodiment. As illustrated in FIG. 1, the speech synthesis device includes a conversion source voice data storage (second storage) 11, a target voice data storage (first storage) 12, a voice data conversion module (first generator) 13, a voice data set generating module (second generator) 14, a speech synthesis data generating module (third generator) 15, a speech synthesis data storage 20, and a speech synthesis module (fourth generator) 16.

The conversion source voice data storage 11 stores therein voice data (conversion source voice data) obtained from an arbitrary uttered voice and attribute information thereof.

The target voice data storage 12 stores therein voice data (target voice data) obtained from a target uttered voice and attribute information thereof.

The voice data means various kinds of data obtained from an uttered voice. For example, the voice data includes various kinds of data extracted from the uttered voice, such as speech units generated by segmenting the waveform of the uttered voice into synthesis units, a fundamental frequency sequence of each accentual phrase of the uttered voice, the duration length of a phoneme included in the uttered voice, and feature parameters such as spectrum parameters obtained from the uttered voice.

The type of voice data stored in the conversion source voice data storage 11 and the target voice data storage 12 varies depending on the type of speech synthesis data generated based on a voice data set. For example, when a speech unit database used to generate the waveform is used as the speech synthesis data, the conversion source voice data storage 11 and the target voice data storage 12 store the speech units obtained from the uttered voice as the voice data. When fundamental frequency sequence generation data used to generate prosody is used as the speech synthesis data, the conversion source voice data storage 11 and the target voice data storage 12 store the fundamental frequency sequence of each accentual phrase of the uttered voice as the voice data. When duration length generation data used to generate prosody is used as the speech synthesis data, the conversion source voice data storage 11 and the target voice data storage 12 store the duration length of the phoneme included in the uttered voice as the voice data. When HMM data is generated as the speech synthesis data, the conversion source voice data storage 11 and the target voice data storage 12 store feature parameters, such as spectrum parameters obtained from the uttered voice. However, the conversion source voice data stored in the conversion source voice data storage 11 and the target voice data stored in the target voice data storage 12 are the same type of voice data.

The speech unit indicates each speech waveform segment obtained by segmenting a speech waveform into predetermined type of speech units (synthesis units), such as phonemes, syllables, half phonemes, or combinations thereof. The spectrum parameters indicate parameters which are obtained for each frame by analyzing the speech waveform and include an LPC coefficient, a mel-LSP coefficient, and a mel-cepstral coefficient. When they are treated as the voice data, as the attribute information thereof, linguistic attribute information, such as a phoneme type, a phonemic environment (phonemic environment information), prosody information, and the position of the phoneme in a sentence, may be used.

The fundamental frequency is information indicating the height of a sound, such as accent or intonation. When a fundamental frequency sequence including accentual phrase units is treated as the voice data, as the attribute information thereof, information, such as the number of morae in an accentual phrase, an accent type, and an accentual phrase type (the position of the accentual phrase in the sentence), may be used.

The duration length of the phoneme is information indicating the length of a sound and corresponds to, for example, the length of the speech unit or the number of frames of the spectrum parameter. When the duration length of the phoneme is treated as the voice data, as the attribute information thereof, the above-mentioned information, such as the phoneme type and the phonemic environment, may be used.

The voice data and the attribute information thereof are not limited to the above-mentioned combinations. For example, in the case of languages other than Japanese, attribute information determined according to the languages, such as information about a word separator, stress accent, or pitch accent, may be used.

In the speech synthesis device according to this embodiment, the target voice is a voice to be synthesized in order to reproduce the quality of the voice or the characteristics of prosody. The target voice differs from a conversion source voice in, for example, speaker individuality, emotions, and a speaking style. In this embodiment, it is assumed that a large amount of voice data is prepared for the conversion source voice data and a small amount of voice data is prepared for the target voice data. For example, a voice when a standard narrator reads a sentence with high coverages of phoneme and prosody may be collected and voice data extracted from the collected voice may be used as the conversion source voice data. In addition, the following voice data may be as the target voice data: voice data which is obtained from a voice uttered by a speaker, such as a user, a specific voice actor, or a famous person, who is different from the speaker related to the conversion source voice data; or voice data with emotions, such as anger, joy, sorrow, and politeness, and a speaking style which are different from those related to the conversion source voice data.

The voice data conversion module 13 converts the conversion source voice data stored in the conversion source voice data storage 11 to be close to target voice quality or prosody, based on the target voice data stored in the target voice data storage 12, the attribute information thereof, and the attribute information of the conversion source voice data stored in the conversion source voice data storage 11, thereby generating converted voice data.

Figure 2:
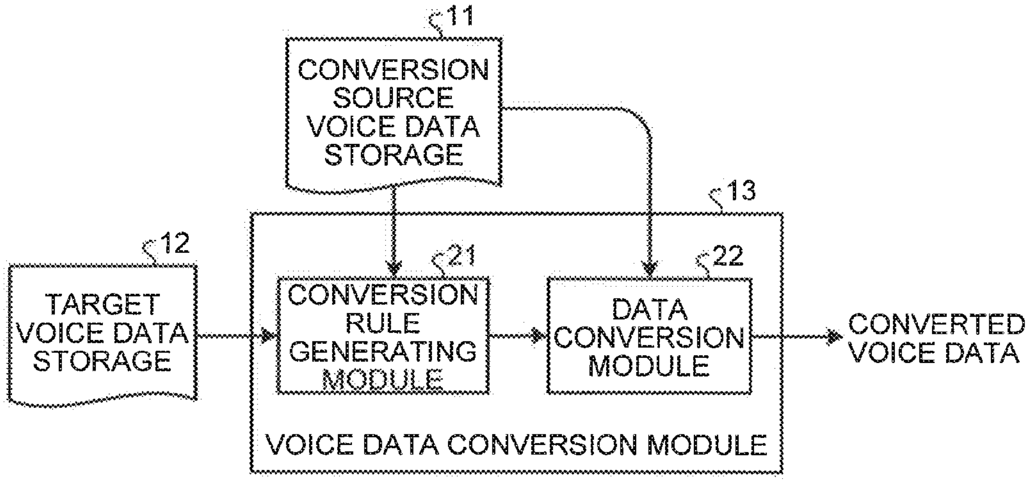
FIG. 2 is a block diagram illustrating an example of a voice data conversion module.

FIG. 2 is a block diagram illustrating an example of the structure of the voice data conversion module 13. As illustrated in FIG. 2, the voice data conversion module 13 includes a conversion rule generating module 21 and a data conversion module 22. The conversion rule generating module 21 generates a conversion rule from the conversion source voice data stored in the conversion source voice data storage 11 and the target voice data stored in the target voice data storage 12. The data conversion module 22 applies the conversion rule generated by the conversion rule generating module 21 to the conversion source voice data to generate converted voice data.

A detailed voice data conversion method of the voice data conversion module 13 varies depending on the type of voice data. When the speech unit or the feature parameter is treated as the voice data, an arbitrary voice conversion method, such as a voice conversion method using a GMM and regression analysis or a voice conversion method based on frequency warping or amplitude spectrum scaling, may be used.

In addition, when the fundamental frequency of the accentual phrase or the duration length of the phoneme is treated as the voice data, an arbitrary prosody conversion method, such as a method of converting an average or a standard deviation according to a target or a histogram conversion method, may be used.

The voice data set generating module 14 adds the converted voice data generated by the voice data conversion module 13 and the target voice data stored in the target voice data storage 12 to generate a voice data set including the target voice data and the converted voice data.

The voice data set generating module 14 may add all of the converted voice data generated by the voice data conversion module 13 and the target voice data to generate the voice data set, or it may add a portion of the converted voice data to the target voice data to generate the voice data set. When a portion of the converted voice data is added to the target voice data to generate the voice data set, it is possible to generate the voice data set such that the converted voice data makes up the deficiency of the target voice data and thus generate the voice data set for reproducing the characteristics of the target uttered voice. At that time, it is possible to determine the converted voice data to be added based on the attribute information of the voice data such that the coverages of each attribute is improved. Specifically, it is possible to determine the converted voice data to be added based on the frequency of the target voice data for each of the categories which are classified based on the attribute information.

Figure 3:
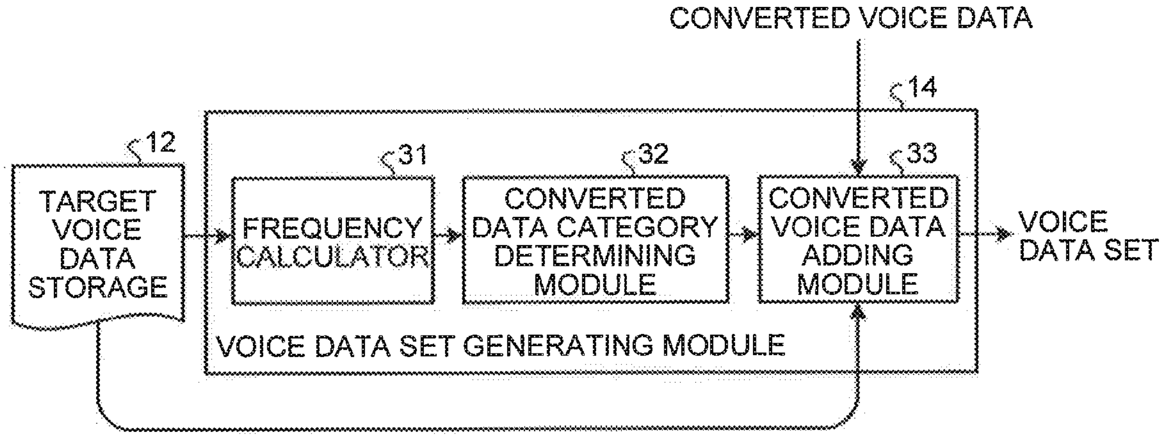
FIG. 3 is a block diagram illustrating an example of a voice data set generating module.

FIG. 3 is a block diagram illustrating an example of the structure of the voice data set generating module 14 which adds a portion of the converted voice data to the target voice data to generate the voice data set. As illustrated in FIG. 3, the voice data set generating module 14 includes a frequency calculator (calculator) 31, a converted data category determining module (determining module) 32, and a converted voice data adding module (adding module) 33. The frequency calculator 31 classifies the target voice data into a plurality of categories based on the attribute information of the target voice data and calculates a category frequency indicating the number of target voice data pieces for each category. The converted data category determining module 32 determines the category (hereinafter, referred to as a converted data category) of the converted voice data to be added to the target voice data based on the calculated category frequency. The converted voice data adding module 33 adds the converted voice data corresponding to the determined converted data category to the target voice data, thereby generating the voice data set.

The category frequency indicates the frequency or number of target voice data pieces for each of the categories which are classified based on the attribute information. For example, when the phonemic environment is used as the attribute information for classifying the categories, the category frequency indicates the frequency or number of target voice data pieces for each phonemic environment of each phoneme. In addition, when the number of morae of the accentual phrase, an accent type, and an accentual phrase type are used as the attribute information for classifying the categories, the category frequency indicates the frequency or number of target voice data pieces for each number of morae, each accent type, and each accentual phrase type (the frequency or number of accentual phrases corresponding to a fundamental frequency sequence which is treated as the target voice data). In addition, the accentual phrase type is attribute information indicating the position of the accentual phrase in a sentence, such as information indicating whether the accentual phrase is at the beginning, middle, or end of the sentence. In addition, information indicating whether the fundamental frequency of the accentual phrase at the end of the sentence increases or grammar information about the subject or verb may be used as the accentual phrase type.

For example, the converted data category determining module 32 can determine a category with a category frequency that is calculated by the frequency calculator 31 and is less than a predetermined value to be the converted data category. In addition, the converted data category determining module 32 may determine the converted data category using methods other than the above-mentioned method. For example, the converted data category determining module 32 may determine the converted data category such that the balance (frequency distribution) of the number of voice data pieces included in the voice data set for each category is close to the balance (frequency distribution) of the number of conversion source voice data pieces for each category.

The speech synthesis data generating module 15 generates speech synthesis data based on the voice data set generated by the voice data set generating module 14. The speech synthesis data is data which is actually used to generate synthesized speech. The speech synthesis data generating module 15 generates the speech synthesis data corresponding to a speech synthesis method by the speech synthesis module 16. For example, when the speech synthesis module 16 generates the synthesized speech using speech synthesis based on unit selection, data (fundamental frequency sequence generation data or duration length generation data) used to generate the prosody of the synthesized speech or a speech unit database, which is a set of the speech units used to generate the waveform of the synthesized speech, is used as the speech synthesis data. In addition, when the speech synthesis module 16 generates the synthesized speech using speech synthesis based on a statistical model (HMM), HMM data used to generate the synthesized speech is the speech synthesis data.

In the speech synthesis device according to this embodiment, the speech synthesis data generating module 15 generates the speech synthesis data based on the voice data set generated by the voice data set generating module 14. In this way, it is possible to generate speech synthesis data capable of reproducing the characteristics of a target uttered voice with high accuracy. In addition, when generating the speech synthesis data based on the voice data set, the speech synthesis data generating module 15 may determine weights such that the weight of the target voice data is more than that of the converted voice data and perform weighted training. In this way, it is possible to generate speech synthesis data to which the characteristics of the target uttered voice are applied. The speech synthesis data generated by the speech synthesis data generating module 15 is stored in the speech synthesis data storage 20.

The speech synthesis module 16 generates synthesized speech from input text using the speech synthesis data generated by the speech synthesis data generating module 15.

Figure 4:
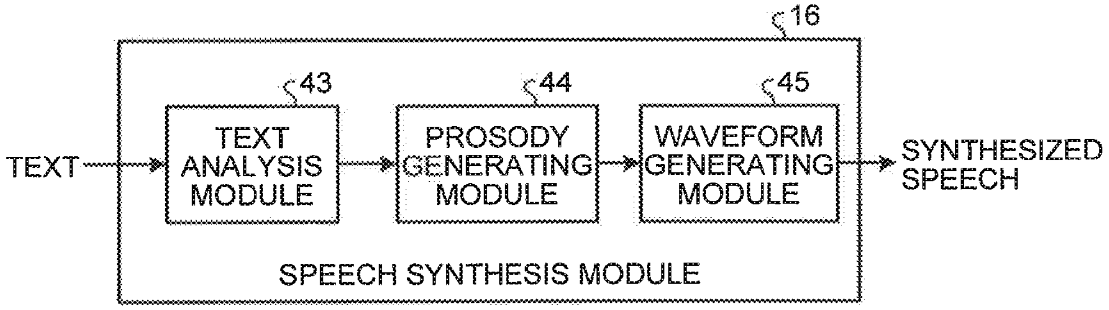
FIG. 4 is a block diagram illustrating an example of a speech synthesis module.

FIG. 4 is a block diagram illustrating an example of the structure of the speech synthesis module 16. As illustrated in FIG. 4, the speech synthesis module 16 includes a text analysis module 43, a prosody generating module 44, and a waveform generating module 45. The text analysis module 43 calculates attribute information used to generate the prosody or waveform of synthesized speech, such as read information, an accentual phrase separator, and an accent type, from input text. The prosody generating module 44 generates the prosody of the synthesized speech corresponding to the input text, specifically, the fundamental frequency sequence of the synthesized speech and the duration length of the phoneme. The waveform generating module 45 receives the phoneme sequence calculated from the read information about the input text, the fundamental frequency sequence generated by the prosody generating module 44, and prosody information, such as the duration length of the phoneme, and generates the speech waveform of the synthesized speech corresponding to the input text.

When speech synthesis based on unit selection is used, the prosody generating module 44 can use a duration length generation method using a sum-of-product model or a fundamental frequency pattern generation method using a fundamental frequency pattern code book and offset prediction. In this case, when the speech synthesis data which is generated by the speech synthesis data generating module 15 based on the voice data set is fundamental frequency sequence generation data (including fundamental frequency pattern selection data or offset estimation data) or duration length generation data (including duration length estimation data), the prosody generating module 44 generates the prosody of the synthesized speech corresponding to the input text using the speech synthesis data. The prosody generating module 44 inputs the generated prosody information to the waveform generating module 45.

When speech synthesis based on unit selection is used, for example, the waveform generating module 45 can represent the distortion of a speech unit using a cost function and use a method of selecting a speech unit in order to minimize costs. In this case, when the speech synthesis data which is generated by the speech synthesis data generating module 15 based on the voice data set is a speech unit database, the waveform generating module 45 selects a speech unit used for speech synthesis from the generated speech unit database. As the cost function, the following costs are used: a target cost indicating the difference between the prosody information input to the waveform generating module 45 and the prosody information of each speech unit or the difference between the phonemic environment and the grammatical attribute obtained from the input text and the phonemic environment and the grammatical attribute of each speech unit; and a concatenation cost indicating the distortion of concatenation between adjacent speech units. The optimal speech unit sequence with the minimum cost is calculated by dynamic programming.

The waveform generating module 45 can concatenate the speech units which are selected in this way to generate the waveform of the synthesized speech. When a plural unit selection and fusion method is used, the waveform generating module 45 selects a plurality of speech units for each synthesis unit and concatenates the speech units generated from a plurality of speech units by, for example, a pitch-cycle waveform averaging process, thereby generating synthesized speech.

When the speech synthesis data is used to perform voice synthesis, the speech synthesis module 16 may preferentially use the target voice data over the converted voice data to generate the synthesized speech. For example, when a speech unit database is generated as the speech synthesis data, information indicating whether a speech unit is the target voice data or the converted voice data is stored as the attribute information of each speech unit included in the speech unit database. When a unit is selected, a sub-cost function in which the cost increases when the converted voice data is used as one of the target costs is used. In this way, it is possible to implement a method of preferentially using the target voice data. As such, when the target voice data is preferentially used over the converted voice data to generate the synthesized speech, it is possible to improve the similarity of the synthesized speech to a target uttered voice.

When speech synthesis based on HMM is used, the prosody generating module 44 and the waveform generating module 45 generate the prosody and waveform of the synthesized speech, based on HMM data which is trained using, for example, a fundamental frequency sequence and a spectrum parameter sequence as the feature parameters. In this case, the HMM data is speech synthesis data which is generated by the speech synthesis data generating module 15 based on the voice data set. In addition, the prosody generating module 44 and the waveform generating module 45 may generate the prosody and waveform of the synthesized speech, based on the HMM data which is trained using a band noise intensity sequence as the feature parameter.

The HMM data has a Gaussian distribution obtained by modeling a decision tree and the static and dynamic feature values of the feature parameters. The decision tree is used to generate a distribution sequence corresponding to the input text and a parameter sequence is generated by a parameter generation algorithm considering dynamic features. The prosody generating module 44 generates the duration length and the fundamental frequency sequence based on the HMM data. In addition, the waveform generating module 45 generates a spectral sequence and a band noise intensity sequence based on the HMM data. An excitation source is generated from the fundamental frequency sequence and the band noise intensity sequence and a filter based on the spectral sequence is applied to the speech waveform.

Figure 5:
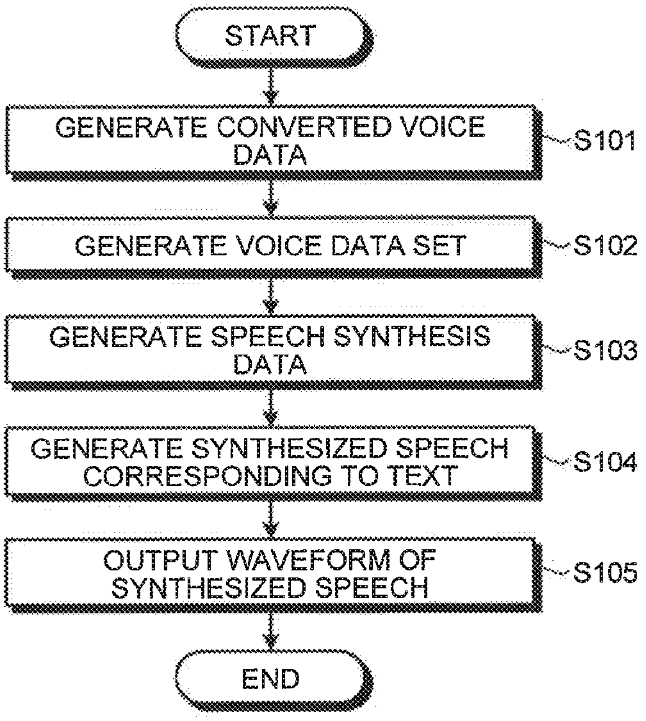
FIG. 5 is a flowchart illustrating the process performed in the speech synthesis device according to the embodiment.

FIG. 5 is a flowchart illustrating the flow of the process performed in the speech synthesis device according to this embodiment.

First, in Step S101, the voice data conversion module 13 converts the conversion source voice data stored in the conversion source voice data storage 11 so as to be close to target voice quality or prosody, thereby generating converted voice data.

Then, in Step S102, the voice data set generating module 14 adds the converted voice data generated in Step S101 and the target voice data stored in the target voice data storage 12 to generate a voice data set.

Then, in Step S103, the speech synthesis data generating module 15 generates speech synthesis data used to generate synthesized speech, based on the voice data set generated in Step S102.

Then, in Step S104, the speech synthesis module 16 generates synthesized speech corresponding to input text using the speech synthesis data generated in Step S103.

Then, in Step S105, the waveform of the synthesized speech generated in Step S104 is output.

In the above description, the speech synthesis device performs all of Steps S101 to S105. However, an external device may perform Steps S101 to S103 in advance and the speech synthesis device may perform only Steps S104 and S105. That is, the speech synthesis device may store the speech synthesis data generated in Steps S101 to S103, generate synthesized speech corresponding to the input text using the stored speech synthesis data, and output the waveform of the synthesized speech. In this case, the speech synthesis device includes the speech synthesis data storage 20 that stores the speech synthesis data which is generated based on the voice data set including the target voice data and the converted voice data and the speech synthesis module 16.

As described above, the speech synthesis device according to this embodiment generates the speech synthesis data based on the voice data set including the target voice data and the converted voice data, and generates the synthesized speech corresponding to the input text using the generated speech synthesis data. Therefore, it is possible to increase the similarity of the synthesized speech to the target uttered voice.

The speech synthesis device according to this embodiment adds a portion of the converted voice data to the target voice data to generate the voice data set. In this way, it is possible to increase the percentage of the target voice data applied to the speech synthesis data, that is, the percentage of the target voice data applied to generate the synthesized speech and thus further increase the similarity of the synthesized speech to the target uttered voice. In this case, the converted voice data to be added to the target voice data is determined based on the category frequency of the target voice data. In this way, it is possible to generate the voice data set with high coverages for each attribute and thus generate speech synthesis data suitable to generate the synthesized speech.

In the speech synthesis device according to this embodiment, even when all of the converted voice data and the target voice data are added to generate the voice data set, the speech synthesis data generating module 15 performs weighting training such that the weight of the target voice data is more than that of the converted voice data to generate the speech synthesis data, or the speech synthesis module 16 preferentially uses the target voice data over the converted voice data to generate the synthesized speech. In this way, it is possible to increase the percentage of the target voice data applied to generate the synthesized speech and thus increase the similarity of the synthesized speech to the target uttered voice.

In the above-mentioned speech synthesis device, the converted voice data adding module 33 of the voice data set generating module 14 adds the converted voice data piece corresponding to the converted data category determined by the converted data category determining module 32 among the converted voice data pieces generated by the voice data conversion module 13 to the target voice data to generate the voice data set. However, after the converted data category determining module 32 determines the converted data category, the voice data conversion module 13 may convert the conversion source voice data corresponding to the converted data category to generate the converted voice data and the converted voice data adding module 33 may add the converted voice data to the target voice data to generate the voice data set.

Figure 6:
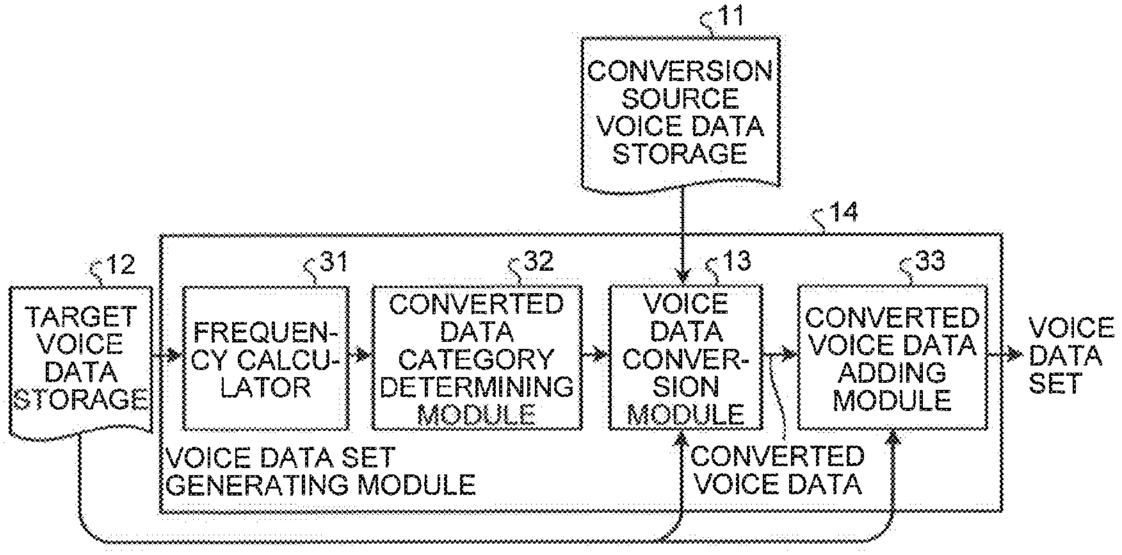
FIG. 6 is a block diagram illustrating an example of a voice data conversion module and a voice data set generating module.

FIG. 6 is a block diagram illustrating an example of the structure of the voice data conversion module 13 and the voice data set generating module 14 according to the above-mentioned modification. In the modification, the voice data conversion module 13 is incorporated into the voice data set generating module 14. The voice data conversion module 13 receives information about the converted data category which is determined by the converted data category determining module 32 based on the category frequency calculated by the frequency calculator 31. Then, the voice data conversion module 13 generates the conversion rule from the target voice data, the attribute information thereof, the conversion source voice data, and the attribute information thereof, converts only the conversion source voice data corresponding to the converted data category determined by the converted data category determining module 32 among the conversion source voice data pieces stored in the conversion source voice data storage 11 to generate converted voice data, and transmits the converted voice data to the converted voice data adding module 33. The converted voice data adding module 33 adds the converted voice data generated by the voice data conversion module 13 to the target voice data to generate the voice data set. In this way, it is possible to reduce the amount of voice data to be converted and thus increase the processing speed.

The speech synthesis device according to this embodiment may include a category presenting module (not illustrated) that presents the converted data category determined by the converted data category determining module 32 to the user. In this case, for example, the category presenting module displays character information or performs voice guide to present the converted data category determined by the converted data category determining module 32 to the user such that the user recognizes the category in which the amount of target voice data is insufficient. In this way, the user can additionally register voice data in the category in which the target voice data is insufficient and it is possible to customize the speech synthesis device which increases similarity to the target uttered voice. That is, first, only a small amount of target voice data may be collected to provide a trial speech synthesis device, and the converted voice data and the target voice data including the additionally collected data may be added to generate speech synthesis data gain, thereby implementing a speech synthesis device with high similarity to the target uttered voice.

In this way, it is possible to rapidly provide a trial speech synthesis device to the application developer of the speech synthesis device and finally provide a speech synthesis device with high similarity to the target voice data to the market.

As described above, the speech synthesis device according to this embodiment generates the voice data set including the target voice data and the converted voice data and generates speech synthesis data used to generate synthesized speech based on the generated voice data set. This technical idea can be applied to both the generation of the waveform of the synthesized speech and the generation of prosody (the fundamental frequency sequence and the duration length of the phoneme) and can also be widely applied to various voice conversion systems or speech synthesis systems.

Next, an example in which the technical idea of this embodiment is applied to the generation of the waveform of the synthesized speech in the speech synthesis device which performs speech synthesis based on unit selection will be described as a first example. In addition, an example in which the technical idea of this embodiment is applied to the generation of the fundamental frequency sequence using the fundamental frequency pattern code book and offset prediction in the speech synthesis device which performs speech synthesis based on unit selection will be described as a second example. Furthermore, an example in which the technical idea of this embodiment is applied to the generation of duration length by the sum-of-product model in the speech synthesis device which performs speech synthesis based on unit selection will be described as a third example. An example in which the technical idea of this embodiment is applied to the generation of the waveform and prosody of the synthesized speech in the speech synthesis device which performs speech synthesis based on HMM will be described as a fourth example.

FIRST EXAMPLE

Figure 7:
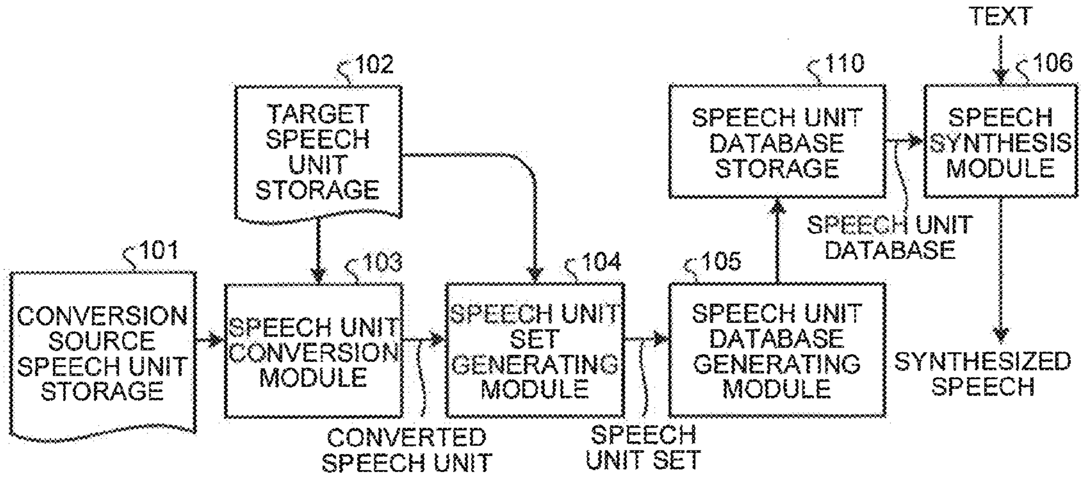
FIG. 7 is a block diagram illustrating a speech synthesis device according to a first example.

FIG. 7 is a block diagram illustrating a speech synthesis device according to a first example. As illustrated in FIG. 7, the speech synthesis device according to the first example includes a conversion source speech unit storage (second storage) 101, a target speech unit storage (first storage) 102, a speech unit conversion module (first generator) 103, a speech unit set generating module (second generator) 104, a speech unit database generating module (third generator) 105, a speech unit database storage 110, and a speech synthesis module (fourth generator) 106.

The conversion source speech unit storage 101 stores a speech unit (conversion source speech unit) obtained from an arbitrary uttered voice and attribute information, such as information about a phoneme type or a phonemic environment.

The target speech unit storage 102 stores a speech unit (target speech unit) obtained from a target uttered voice and attribute information, such as a phoneme type or phonemic environment information.

Figure 8:
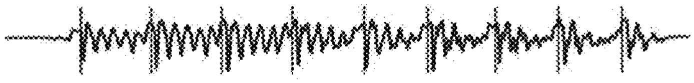
FIG. 8 is a diagram illustrating an example of a speech unit and attribute information.
Figure 8:
Figure 8:
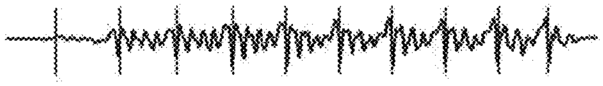

FIG. 8 illustrates an example of the speech units and the attribute information stored in the target speech unit storage 102 and the conversion source speech unit storage 101. In this example, a half phoneme is used as a synthesis unit and a waveform obtained by segmenting the waveform of an uttered voice into half phoneme units is used as the speech unit. The target speech unit storage 102 and the conversion source speech unit storage 101 store the waveform of the speech unit and the attribute information of the speech unit, such as a phoneme name indicating the phoneme type, an adjacent phoneme name, which is the phonemic environment information, a fundamental frequency, duration length, a boundary spectrum parameter, and information about a pitch mark.

The speech unit and the attribute information stored in the target speech unit storage 102 and the conversion source speech unit storage 101 are generated as follows. First, a phoneme boundary is calculated from the waveform data of an uttered voice and the read information thereof and is then labeled, and the fundamental frequency is extracted. Then, the waveform of each half phoneme is divided into speech units based on the labeled phoneme. In addition, the pitch mark is calculated from the fundamental frequency and spectrum parameters are calculated at the boundary between the speech units. For example, parameters, such as mel-cepstrum or mel-LSP, may be used as the spectrum parameters. The phoneme name indicates information about the name of the phoneme and whether the half phoneme is a left half phoneme or a right half phoneme. In addition, for the adjacent phoneme name, a left phoneme name is stored as the adjacent phoneme in the case of the left half phoneme, and a right phoneme name is stored as the adjacent phoneme in the case of the right half phoneme. In FIG. 8, /SIL/ indicates that the adjacent phoneme, such as pause or the beginning of the sentence, is silent. The fundamental frequency indicates an average fundamental frequency in the speech unit and the duration length indicates the length of the speech unit. The spectrum parameters at the concatenation boundary are stored.

The speech unit conversion module 103 converts the conversion source speech unit stored in the conversion source speech unit storage 101 so as to be close to target voice quality, thereby generating a converted speech unit.

Figure 9:
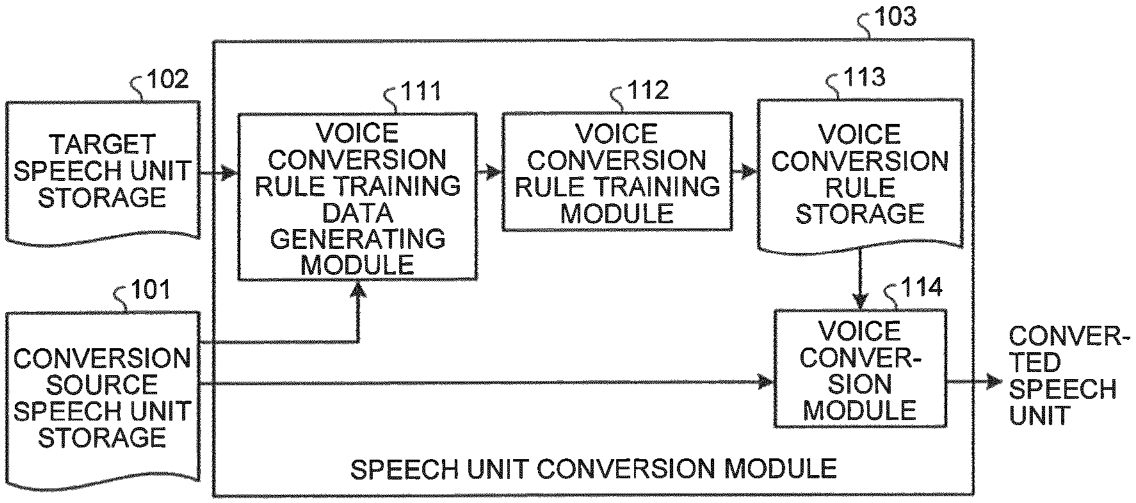
FIG. 9 is a block diagram illustrating an example of a speech unit conversion module.

FIG. 9 is a block diagram illustrating an example of the structure of the speech unit conversion module 103. As illustrated in FIG. 9, the speech unit conversion module 103 includes a voice conversion rule training data generating module 111, a voice conversion rule training module 112, a voice conversion rule storage 113, and a voice conversion module 114.

The voice conversion rule training data generating module 111 associates the target speech unit stored in the target speech unit storage 102 with the conversion source speech unit stored in the conversion source speech unit storage 101 to generate a pair of speech units which are training data for the voice conversion rule. For example, the pair of speech units may be generated as follows: the target speech unit storage 102 and the conversion source speech unit storage 101 are generated from a voice including the same sentence and the speech units in the same sentence are associated with each other; or the distance between each speech unit of the target speech unit and the conversion source speech unit is calculated and the closest speech units are associated with each other.

Figure 10:
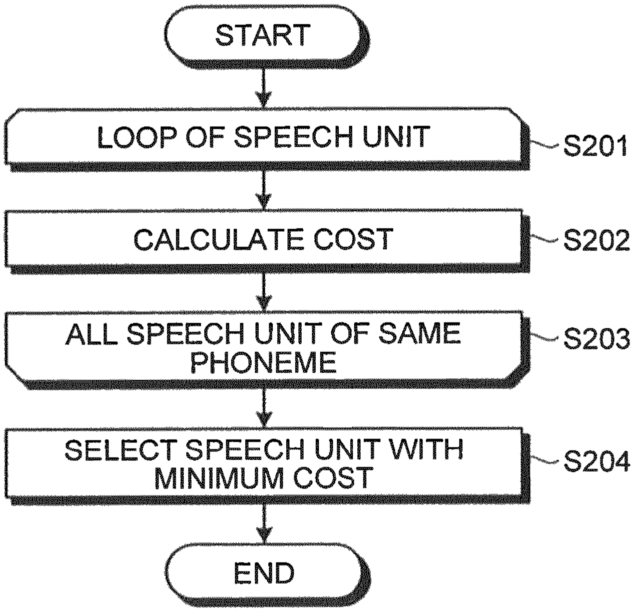
FIG. 10 is a flowchart illustrating the process performed in a voice conversion rule training data generating module.

FIG. 10 is a flowchart illustrating a process performed when the voice conversion rule training data generating module 111 calculates the cost between the speech units using the distance between the attributes and performs unit selection from the conversion source speech units for each target speech unit such that the cost is minimized. In this case, the voice conversion rule training data generating module 111 performs a loop for all of the speech units of the same phoneme stored in the conversion source speech unit storage 101 for each target speech unit stored in the target speech unit storage 102 in Steps S201 to S203, and calculates the cost in Step S202. The cost indicates the distortion between the attribute information of the target speech unit and the attribute information of the conversion source speech unit using a cost function, and is represented by a sub-cost function $C_n(u_t, u_c)$ (n: 1, . . . , N, N is the number of sub-cost functions) for each attribute information. In the sub-cost function, $u_t$ indicates a target speech unit and $u_c$ indicates the speech unit of a conversion source. The sub-cost function uses a fundamental frequency cost $C_1(u_t, u_c)$ which indicates the difference between the fundamental frequencies of the target speech unit and the speech unit of the conversion source, a phoneme duration length cost $C_2(u_t, u_c)$ which indicates a difference in phoneme duration length, spectrum costs $C_3(u_t, u_c)$ and $C_4(u_t, u_c)$ which indicate a difference in spectrum at the boundary of the speech units, and phonemic environment costs $C_3(u_t, u_c)$ and $C_6(u_t, U_c)$ which indicate a difference in phonemic environment.

Specifically, the fundamental frequency cost $C_1(u_t, u_c)$ is calculated as a difference in logarithmic fundamental frequency as represented by the following Expression (1):

$$C_1(u_t, u_c)=\{\log(f(u_t))-\log(f(u_c))\}^2 \tag{1}$$

where f(u) indicates a function for extracting an average fundamental frequency from attribute information corresponding to a speech unit u.

The phoneme duration length cost $C_2(u_t, u_c)$ is calculated from the following Expression (2):

$$C_2(u_t, u_c)=\{g(u_t)-g(u_c)\}^2 \tag{2}$$

wherein g(u) indicates a function for extracting phoneme duration length from attribute information corresponding to the speech unit u.

The spectrum costs $C_3(u_t, u_c)$ and $C_4(u_t, u_c)$ are calculated from a cepstrum distance at the boundary between the speech unit, as represented by the following Expression (3):

$$C_3(u_t, u_c)=\|h^l(u_t))-h^l(u_c)\|$$

$$C_4(u_t, u_c)=\|h^r(u_t)-h^r(u_c)\| \tag{3}$$

where $h^l(u)$ indicates the left boundary of the speech unit u and $h^r(u)$ indicates a function for extracting the cepstrum coefficient of the right boundary of the speech unit as a vector.

The phonemic environment costs $C_n(u_t, u_c)$ and $C_6(u_t, u_c)$ are calculated from a distance indicating whether adjacent speech units are the same, as represented by the following Expression (4):

$$C_5(u_t, u_c) = \begin{cases} 1 \ldots \text{ left phonemic environment is identical} \\ 0 \ldots \text{ others} \end{cases} \tag{4}$$

$$C_6(u_t, u_c) = \begin{cases} 1 \ldots \text{ right phonemic environment is identical} \\ 0 \ldots \text{ others} \end{cases}$$

The cost function $C_n(u_t, u_c)$ indicating the distortion between the attribute information of the target speech unit and the attribute information of the conversion source speech unit is defined as the weighted sum of the sub-cost functions, as represented by the following Expression (5):

$$C(u_t, u_c) = \sum_{n=1}^{N} w_n C_n(u_t, u_c) \tag{5}$$

where $w_n$ indicates the weight of the sub-cost function.

Here, $w_n$ may be all set to "1" or it may be set to an arbitrary value such that the speech unit is appropriately selected.

The above-mentioned Expression (5) is the cost function of the speech unit which indicates distortion when one of the conversion source speech units is applied to a given target speech unit. The voice conversion rule training data generating module 111 performs the cost calculation in Step S202 of FIG. 10 and selects a conversion source speech unit with the minimum cost in Step S204. In this way, a pair of speech units, which is training data, is generated. The same phoneme means that the types of phonemes corresponding to a speech unit are the same. In the case of a half phoneme unit, for example, the types of the "left unit of a" or the types of the "right unit of i" are the same.

When the voice conversion rule training data generating module 111 generates the pair of speech units, which is the training data for the voice conversion rule, the voice conversion rule training module 112 performs leaning using the training data to generate the voice conversion rule. The voice conversion rule is for bringing the conversion source speech unit close to the target speech unit and may be generated as, for example, a rule for converting the spectrum parameters of the speech unit.

The voice conversion rule training module 112 performs training to generate the voice conversion rule for voice conversion using mel-cepstrum regression analysis based on, for example, the GMM. In the voice conversion rule base on the GMM and the conversion source spectrum parameters are modeled by the GMM, the input conversion source spectrum parameters are weighted by posterior probability observed in each mixed component of the GMM, and voice conversion is performed. GMM λ is the mixture of Gaussian distributions and is represented by the following Expression (6):

$$p(x \mid \lambda) = \sum_{c=1}^{C} w_c p(x \mid \lambda_c) = \sum_{c=1}^{C} w_c N(x \mid \mu_c, \Sigma_c) \tag{6}$$

where p is likelihood, c is mixture, $w_c$ is a mixture weight, $p(x|\lambda_c)=N(x|\mu_c, \Sigma_c)$ is the likelihood of the Gaussian distribution of the mean $\mu_c$ and dispersion $\Sigma_c$ of the mixture c.

In this case, the voice conversion rule based on the GMM is represented by the following Expression (7) using the regression matrix of each mixture as the weighted sum of $A_c$:

$$y' = \sum_{c=1}^{C} p(m_c \mid x) A_c x',\ x' = (x^T, 1)^T \tag{7}$$

where $p(m_c|x)$ is the probability of x being observed in mixture $m_c$.

The probability is calculated by the following Expression (8):

$$p(m_c \mid x) = \frac{w_c p(x \mid \lambda_c)}{p(x \mid \lambda)} \tag{8}$$

The voice conversion based on the GMM is characterized in that the regression matrix which is continuously changed between the mixtures is obtained. When the regression matrix of each mixture is $A_c$, x is applied such that the regression matrix of each mixture is weighted based on the posterior probability represented by the above-mentioned Expression (7).

Figure 11:
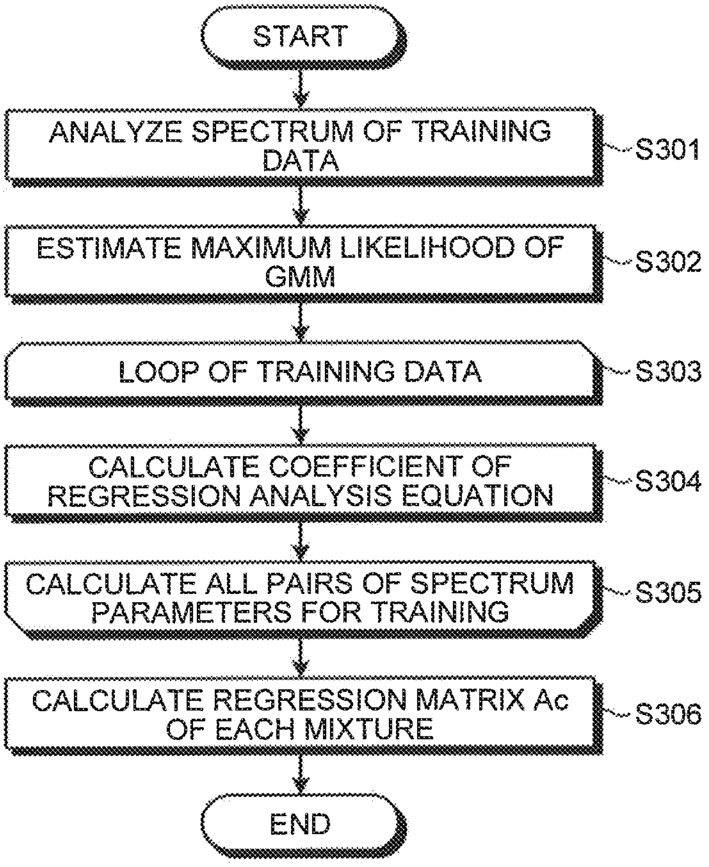
FIG. 11 is a flowchart illustrating the process performed in a voice conversion rule training module.

FIG. 11 is a flowchart illustrating the process performed in the voice conversion rule training module 112. As illustrated in FIG. 11, first, in Step S301, the voice conversion rule training module 112 performs spectral analysis on the speech unit, which is training data, to calculate a feature value. When mel-cepstrum is extracted as the spectral feature by pitch synchronous analysis, a pitch-cycle waveform is extracted by a windowing process with a Hanning window having a length that is two times more than the pitch, with each pitch mark of the speech unit as the center. Then, mel-cepstrum analysis is applied to the extracted pitch-cycle waveform. In this way, it is possible to calculate the feature value. In the case of an unvoiced sound or when the pitch synchronous analysis is not used, in order to calculate the feature value, spectral analysis may be performed in a short time using a predetermined frame length and a frame rate or other parameters, such as mel-LSP, may be used.

Then, in Step S302, the voice conversion rule training module 112 estimates the maximum likelihood of the GMM. First, for the GMM, an initial cluster is generated by an LBG algorithm and is updated by an EM algorithm, thereby estimating the maximum likelihood of each parameter of the GMM. In this way, it is possible to train the model.

Then, the voice conversion rule training module 112 performs a loop for all of the training data in Steps S303 to S305 and calculates the coefficient of an equation for calculating the regression matrix in Step S304. Specifically, the weight calculated by the above-mentioned Expression (7) is used to calculate the coefficient of the equation for regression analysis. The equation for regression analysis is represented by the following Expression (9):

$$(X^T X)a^k = X^T Y^k \tag{9}$$

In Expression (9), when k is the order of the spectrum parameter, $Y^k$ is a vector in which target k-order spectrum parameters are arranged, X is a matrix of vectors which are obtained by adding an offset term l to the spectrum parameter of a change source, which is a pair of target spectrum parameters, and multiplying each mixture weight of the GMM to the sum, and $a^k$ is a vector obtained by arranging the vectors corresponding to a k-order component of the regression matrix of each mixture. X and $a^k$ are represented by the following Expression (10): PGP-2E $$X = \begin{pmatrix} p(m_1 \mid x_N, \lambda)x_1^T & p(m_1 \mid x_1, \lambda)\cdot 1 & & p(m_c \mid x_1, \lambda)x_1^T & p(m_c \mid x_1, \lambda)\cdot 1 \\ \vdots & \vdots & \cdots & \vdots & \vdots \\ p(m_1 \mid x_N, \lambda)x_N^T & p(m_1 \mid x_N, \lambda)\cdot 1 & & p(m_c \mid x_N, \lambda)x_N^T & p(m_c \mid x_N, \lambda)\cdot 1 \end{pmatrix}, \tag{10}$$

$$a^k = (a_{l,1}^k \ldots a_{K,1}^k b_1^k \ldots a_{1,C}^k \ldots a_{K,C}^k b_C^k)^T$$

where $X^T$ indicates the transposition of the matrix X.

The voice conversion rule training module 112 calculates $(X^T X)$ and $X^T Y^k$ in Steps S303 to S305 and calculates a solution to an equation using, for example, Gaussian elimination or Cholesky decomposition to calculate the regression matrix $A_c$ of each mixture in Step S306.

As such, in the voice conversion rule based on the GMM, the model parameter λ of the GMM and the regression matrix $A_c$ of each mixture are the voice conversion rule and the obtained rule is stored in the voice conversion rule storage 113.

The voice conversion module 114 applies the voice conversion rule stored in the voice conversion rule storage 113 to the conversion source speech unit to calculate the converted speech unit.

Figure 12:
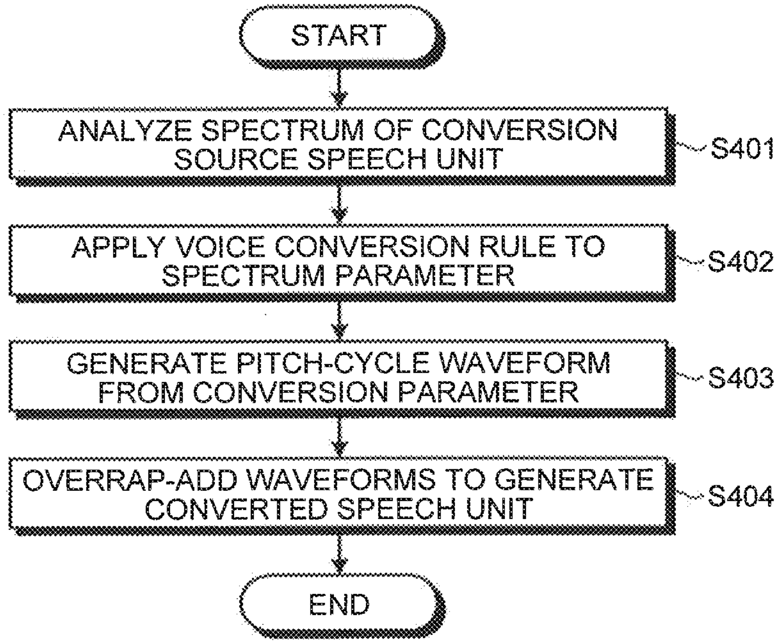
FIG. 12 is a flowchart illustrating the process performed in a voice conversion module.

FIG. 12 is a flowchart illustrating the process performed in the voice conversion module 114. As illustrated in FIG. 12, first, the voice conversion module 114 performs spectral analysis for the conversion source speech unit in Step S401 and converts the spectrum parameter calculated in Step S401 using the voice conversion rule stored in the voice conversion rule storage 113 in Step S402. That is, the voice conversion module 114 applies the conversion process represented by the above-mentioned Expression (7) in Step S402.

Then, the voice conversion module 114 generates the pitch-cycle waveform from the conversion parameter in Step S403 and overwrap-adds the pitch-cycle waveforms obtained in Step S403 to generate the converted speech unit in Step S404.

Figure 13:
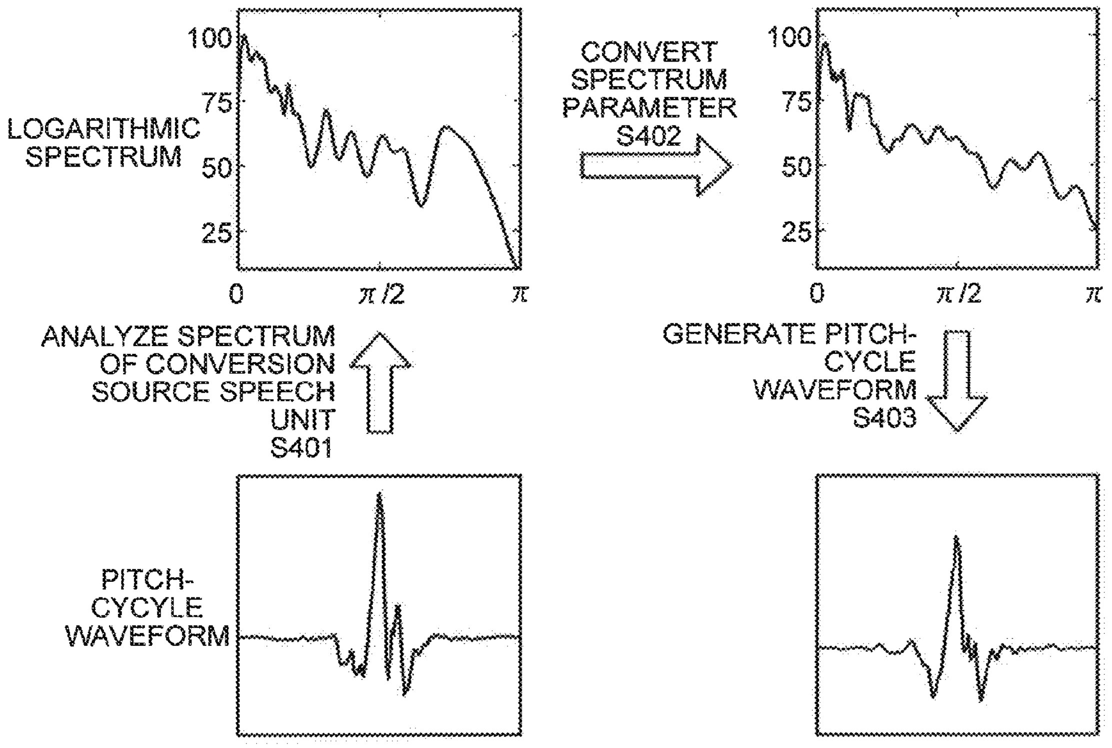
FIG. 13 is a diagram illustrating an example of the process of the voice conversion module.

FIG. 13 is an example of the actual conversion of the conversion source speech unit into the converted speech unit. The voice conversion module 114 applies spectral analysis to the pitch-cycle waveform extracted from the conversion source speech unit (Step S401) to calculate a logarithmic spectrum and calculates the spectrum parameter. The voice conversion module 114 applies the voice conversion rule to the spectrum parameter (Step S402) to obtain the conversion parameter, generates the pitch-cycle waveform from the conversion parameter using, for example, inverse FFT (Step S403), and overwrap-adds the generated pitch-cycle waveforms to generate the converted speech unit (Step S404).

As described above, the speech unit conversion module 103 applies voice conversion generated from the target speech unit and the conversion source speech unit to the conversion source speech unit, thereby generating the converted speech unit. The structure of the speech unit conversion module 103 is not limited to the above-mentioned structure, but other voice conversion methods, such as a method using only regression analysis, a method considering the distribution of a dynamic feature, and a method of performing conversion to a sub-band base parameter using frequency warping and amplitude shift, may be used.

The speech unit set generating module 104 adds the converted speech unit generated by the speech unit conversion module 103 and the target speech unit stored in the target speech unit storage 102 to generate the speech unit set including the target speech unit and the converted speech unit.

The speech unit set generating module 104 may add all of the converted speech units generated by the speech unit conversion module 103 and the target speech unit to generate the speech unit set, or it may add some of the converted speech units to the target speech unit to generate the speech unit set. In a state in which a large number of conversion source speech units and a small number of target speech units are used, when all of the converted speech units and the target speech units are added to generate the speech unit set, the rate of use of the converted speech unit increases during the generation of synthesized speech and the target speech unit is not likely to be used even in a section in which there are an appropriate number of target speech units. Therefore, for the phoneme in the target speech unit, the target speech unit is used without any change and insufficient speech units are added from the converted speech units. In this way, it is possible to generate a speech unit set with high coverages while applying the target speech units.

Figure 14:
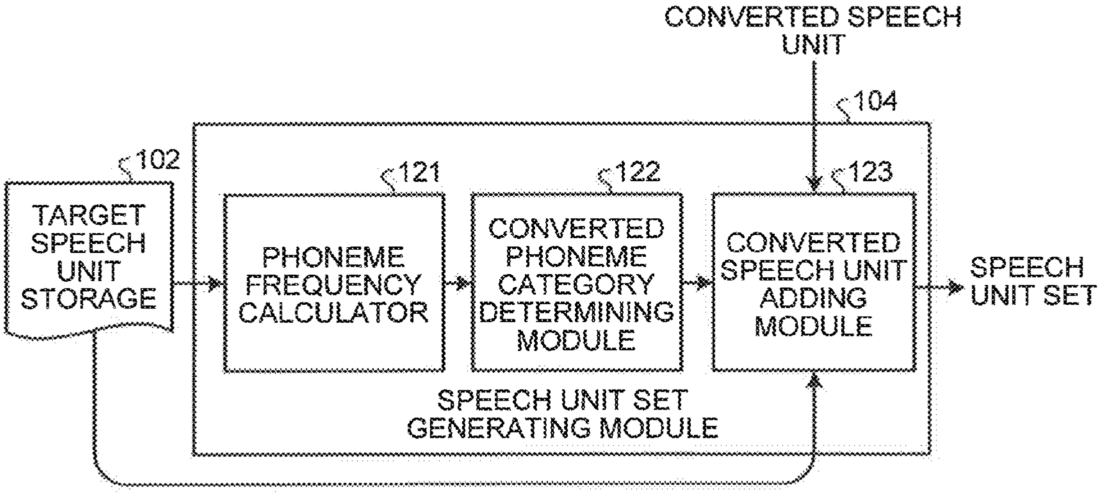
FIG. 14 is a block diagram illustrating an example of a speech unit set generating module.

FIG. 14 is a block diagram illustrating an example of the structure of the speech unit set generating module 104 that adds some of the converted speech units to the target speech unit to generate the speech unit see. In this example, the speech unit set generating module 104 uses the phoneme name indicating the type of phoneme as the attribute information of the speech unit. As illustrated in FIG. 14, the speech unit set generating module 104 includes a phoneme frequency calculator (calculator) 121, a converted phoneme category determining module (determining module) 122, and a converted speech unit adding module (adding module) 123.

The phoneme frequency calculator 121 calculates the number of target speech units for each phoneme category in the target speech unit storage 102 and calculates the category frequency for each phoneme category. For example, among the attribute information items illustrated in FIG. 8, the phoneme name indicating the type of phoneme is used to calculate the category frequency for each phoneme category.

The converted phoneme category determining module 122 determines the category (hereinafter, referred to as a converted phoneme category) of the converted speech unit to be added to the target speech unit based on the calculated category frequency for each phoneme category. In order to determine the converted phoneme category, for example, a method may be used in which the phoneme category with a category frequency less than a predetermined value is determined to be the converted phoneme category.

The converted speech unit adding module 123 adds the converted speech unit corresponding to the determined converted phoneme category to the target speech unit to generate the speech unit set.

Figures 15, 16:
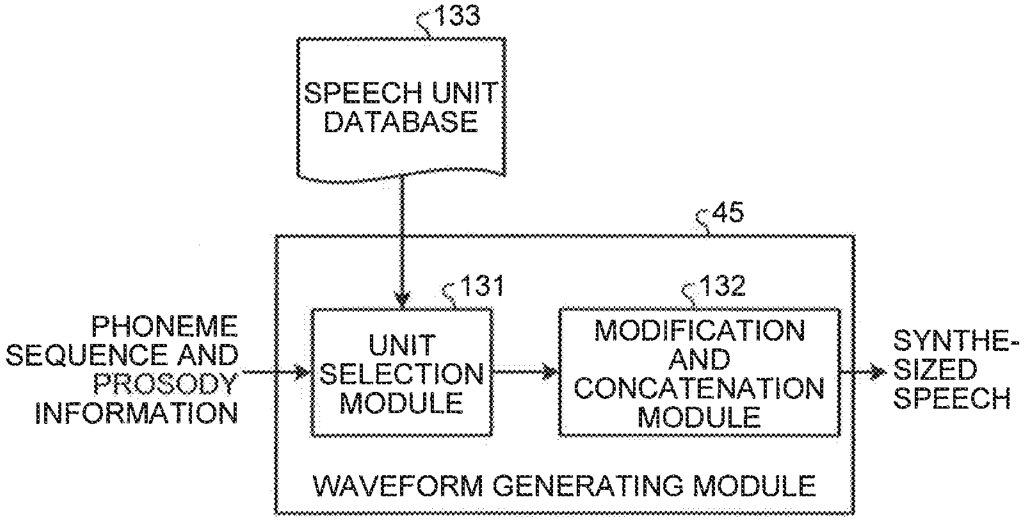
FIG. 15 is a diagram illustrating an example of a phoneme frequency table.
FIG. 16 is a block diagram illustrating the details of a waveform generating module of the speech synthesis module.

FIG. 15 is a diagram illustrating an example of a phoneme frequency table indicating the category frequency for each phoneme category calculated by the phoneme frequency calculator 121. FIG. 15 illustrates the number of speech units of phonemes /a/, /i/, . . . in one target sentence, 10 target sentences, and 50 target sentences and 600 conversion source sentences. The one target sentence, 10 target sentences, and 50 target sentences mean that one sentence, 10 sentences, and 50 sentences are read when a target uttered voice used to extract the target speech unit is collected. The 600 conversion source sentences mean that 600 sentences are read when an arbitrary uttered voice used to extract the conversion source speech unit is collected.

In the example illustrated in FIG. 15, for example, in the case of 10 target sentences, the category frequency of the phoneme /a/ is 53 and the category frequency of the phoneme /g/ is 7, which are significantly less than those, 4410 and 708, of the 600 conversion source sentences. When the above-mentioned predetermined value, which is a threshold value for determining the converted phoneme category, is 15, the converted phoneme category determining module 122 determines all of the phoneme categories to be the converted phoneme category in the case of the one target sentence, determines /g/, /z/, /ch/, and /ki/ to be the converted phoneme category in the case of the 10 target sentences, and determines /z/ and /ki/ to be the converted phoneme category in the case of the 50 target sentences. In addition, /ki/ indicates a devoiced vowel /ki/. The converted speech unit adding module 123 adds the converted speech unit corresponding to the determined converted phoneme category to the target speech unit to generate the speech unit set.

As described above, the speech unit set generating module 104 illustrated in FIG. 14 adds the converted speech unit corresponding to the phoneme category with a small number of target speech units to the target speech unit to generate the speech unit set. Here, in a case in which all of the conversion source speech units are added to the target speech units to generate the speech unit set, for example, in the case of /a/ in the 50 target sentences, there are 253 target speech units and speech units in an appropriate environment are likely to be included in an input sentence. However, for /a/, which is a corresponding phoneme category, when 4410 conversion source speech units are all added, only 5.4% of speech units /a/ become the target speech units and the possibility of them being used is reduced. Therefore, there is a concern that the similarity of synthesized speech to a target uttered voice will be reduced. In contrast, when the converted phoneme category is determined according to the category frequency for each phoneme category and the converted speech unit corresponding to the phoneme category with a low category frequency is added to the target speech unit to generate the speech unit set, it is possible to prevent a reduction in the similarity of synthesized speech to a target due to the addition of the number of converted speech units equal to or more than a necessary value and thus obtain synthesized speech which reproduces the features of a target uttered voice with high accuracy.

In this example, the phoneme name indicating the type of phoneme is used as the attribute information to calculate the category frequency for each phoneme category. However, the phoneme name and the phonemic environment may be used as the attribute information to calculate the category frequency for each phoneme category. As illustrated in FIG. 8, the target speech unit storage 102 and the conversion source speech unit storage 101 also store the adjacent phoneme name, which is phonemic environment information, as the attribute information of the speech unit. Therefore, it is possible to calculate the category frequency for each adjacent phoneme in each phoneme. As such, since the phoneme name and the adjacent phoneme name are used as the attribute information to calculate the category frequency, it is possible to determine the converted phoneme category in detail and appropriately add the converted speech unit.

In addition, other attribute information items, such as the fundamental frequency and duration length, may be used as the attribute information used to calculate the category frequency.

When the converted speech unit is added to the target speech unit to generate the speech unit set, a plurality of converted speech units, such as speech units adjacent to the converted speech unit corresponding to the converted phoneme category, a plurality of converted speech units in the vicinity of the converted speech unit, or converted speech units in the sentence including the converted speech unit, may be added. In this way, neighboring converted speech units with a low concatenation cost may be included in the speech unit set.

When the converted speech unit is added to the target speech unit to generate the speech unit set, all of the converted speech units included in the converted phoneme category may be added or some of the converted speech units may be added. When some of the converted speech units are added, the upper limit of the number of converted speech units to be added may be determined and the converted speech units may be selected in order of appearance or at random, or the converted speech units may be clustered and representative converted speech units in each cluster may be added. When the representative converted speech units in each cluster are added, it is possible to appropriately add the converted speech units while maintaining coverages.

The speech unit database generating module 105 generates a speech unit database, which is a set of speech units used to generate the waveform of the synthesized speech, based on the speech unit set generated by the speech unit set generating module 104. In this example, the speech units of the speech unit set and the attribute information are used to generate the speech unit database and, for example, a waveform compression process is applied to generate speech unit data which can be input to the speech synthesis module 106, if necessary.

The speech unit database generated by the speech unit database generating module 105 includes the speech units which are used for speech synthesis by the speech synthesis module 106 based on unit selection and the attribute information thereof. The speech unit database is stored as an example of speech synthesis data, which is data used for speech synthesis by the speech synthesis module 106, in the speech unit database storage 110. For example, similarly to the example of the target speech unit storage 102 and the conversion source speech unit storage 101 illustrated in FIG. 8, as the speech unit database, the waveform of the speech unit having a pitch mark given thereto is stored together with a number for identifying the speech unit. In addition, attribute information used for unit selection, such as a phoneme name indicating the type of phoneme, an adjacent phoneme name, which is phonemic environment information, a fundamental frequency, duration length (the duration length of a phoneme), and a concatenation boundary cepstrum parameter, is stored as the speech unit database. As the attribute information, attribute information stored in the target speech unit storage 102 and the conversion source speech unit storage 101 is used.

The speech synthesis module 106 generates synthesized speech corresponding to the input text using the speech unit database generated by the speech unit database generating module 105. Specifically, in the speech synthesis module 106, the text analysis module 43 and the prosody generating module 44 illustrated in FIG. 4 perform processing on the input text and the waveform generating module 45 performs a unit selection process using the speech unit database generated by the speech unit database generating module 105, thereby generating the synthesized speech.

FIG. 16 is a block diagram illustrating the details of the waveform generating module 45 in the speech synthesis module 106. As illustrated in FIG. 16, the waveform generating module 45 in the speech synthesis module 106 includes a unit selection module 131 and a modification and concatenation module 132. The unit selection module 131 selects the speech unit used for the synthesized speech from the speech units stored in a speech unit database 133 based on an input phoneme sequence and input prosody information. The modification and concatenation module 132 performs a prosody modification and concatenation process on the speech unit selected by the unit selection module 131 according to the input prosody information and generates the speech waveform of the synthesized speech. The modification and concatenation module 132 may concatenate the speech units selected by the unit selection module 131 to generate the speech waveform of the synthesized speech, without performing prosody modification.

As described above, the speech unit database 133 used for the unit selection process of the unit selection module 131 is generated from the speech unit set including the target speech unit and the converted speech unit. The unit selection module 131 estimates the degree of distortion of the synthesized speech based on the input prosody information and the attribute information stored in the speech unit database 133, for each speech unit of the input phoneme sequence, and selects the speech unit used for the synthesized speech from the speech units stored in the speech unit database 133 based on the estimated degree of distortion of the synthesized speech.

The degree of distortion of the synthesized speech is calculated as the weighted sum of a target cost, which is distortion based on the difference between the attribute information stored in the speech unit database 133 and the attribute information, such as the phoneme sequence or the prosody information generated by the text analysis module 43 and the prosody generating module 44 illustrated in FIG. 4, and a concatenation cost, which is distortion based on the difference in phoneme environment between the speech units to be concatenated.

Here, a sub-cost function $C_n(u_i, u_{i-1}, t_i)$ (n: 1, . . . , N, N is the number of the sub-cost functions) is determined for each factor of the distortion which occurs when the speech units are modified and concatenated to generate synthesized speech. The cost function represented by the above-mentioned Expression (5) is for measuring the distortion between two speech units. The cost function defined in this example is for measuring the distortion between the speech unit and the prosody and phoneme sequence input to the waveform generating module 45.

Here, $t_i$ indicates target attribute information of a speech unit corresponding to an i-th unit when a target voice (target speech) corresponding to the input phoneme sequence and the input prosodic information is $t=(t_1, \ldots, t_I)$, and $u_i$ indicates a speech unit of the same phoneme as $t_i$ among the speech units stored in the speech unit database 133. The sub-cost function is for calculating costs for estimating the degree of distortion between the target voice and the synthesized speech which is generated when the speech unit stored in the speech unit database 133 is used to generate the synthesized speech.

As the target cost, the following costs are used: a fundamental frequency cost which indicates the difference between the fundamental frequency of the speech unit stored in the speech unit database 133 and a target fundamental frequency; a phoneme duration length cost which indicates the difference between the phoneme duration length of the speech unit and a target phoneme duration length; and a phonemic environment cost which indicates the difference between the phoneme duration length of the speech unit and a target phonemic environment. As a concatenation cost, a spectrum concatenation cost which indicates the difference between the spectrums at a concatenation boundary is used.

Specifically, the fundamental frequency cost is calculated from the following Expression (11):

$$C_1(u_1, u_{i-1}, t_i)=\{\log(f(v_i))-\log(f(t_i))\}^2 \quad (11)$$

where $v_i$ indicates the attribute information of a speech unit $u_i$ stored in the speech unit database 133 and $f(v_i)$ indicates a function for extracting an average fundamental frequency from the attribute information $v_i$.

In addition, the phoneme duration length cost is calculated from the following Expression (12):

$$C_2(u_i, u_{i-1}, t_i)=\{g(v_i)-g(t_i)\}^2 \quad (12)$$

where $g(v_i)$ indicates a function for extracting a phoneme duration length from a phoneme environment $v_i$.

The phonemic environment cost is calculated from the following Expression (13) and indicates whether adjacent phonemes are identical to each other:

$$C_3(u_t, u_{i-1}, t_i) = \begin{cases} 1 \ldots \text{ left phonemic environment is identical} \\ 0 \ldots \text{ others} \end{cases} \quad (13)$$

$$C_4(u_t, u_{i-1}, t_i) = \begin{cases} 1 \ldots \text{ right phonemic environment is identical} \\ 0 \ldots \text{ others} \end{cases}$$

The spectral concatenation cost is calculated from a cepstrum distance between two speech units, as represented by the following Expression (14):

$$C_5(u_i, u_{i-1}, t_i)=\|h(u_i)-h(u_{i-1})\| \quad (14)$$

where $h(u_i)$ indicates a function for extracting the cepstrum coefficient of the speech unit $u_i$ at the concatenation boundary as a vector.

The weighted sum of the sub-cost functions is defined as a speech unit cost function. The speech unit cost function is represented by the following Expression (15):

$$C(u_i, u_{i-1}, t_i) = \sum_{n=1}^{N} w_n C_n(u_i, u_{i-1}, t_i) \quad (15)$$

where $w_n$ indicates the weight of the sub-cost function.

Here, $w_n$ may be all set to "1" or it may be appropriately adjusted.

The above-mentioned Expression (15) is the speech unit cost of the speech unit when a given speech unit is applied to a given synthesis unit. A cost means the sum of the speech unit costs of the segments obtained by dividing an input phoneme sequence into speech units which are calculated by the above-mentioned Expression (15). A cost function for calculating the cost is defined, as represented by the following Expression (16):

$$\text{Cost} = \sum_{i=1}^{T} C(u_i, u_{i-1}, t_i) \quad (16)$$

The unit selection module 131 selects the speech unit used for the synthesized speech from the speech units stored in the speech unit database 133 using the cost functions represented by the above-mentioned Expressions (11) to (16). Here, a speech unit sequence with a minimum cost calculated by the cost function represented by Expression (16) is calculated from the speech units stored in the speech unit database 133. It is assumed that a set of the speech units with the minimum cost is referred to as an optimal unit sequence. That is, each speech unit in the optimal speech unit sequence corresponds to each of a plurality of units obtained by dividing an input phoneme sequence into synthesis units, and the speech unit cost calculated from each speech unit in the optimal speech unit sequence and the cost calculated by the above-mentioned Expression (16) are less than those of any other speech unit sequences. The optimal unit sequence can be efficiently searched by dynamic programming (DP).

The modification and concatenation module 132 modifies the speech units selected by the unit selection module 131 according to input prosody information and concatenates the speech units to generate the speech waveform of the synthesized speech. The modification and concatenation module 132 may extract the pitch-cycle waveform from the selected speech unit and overwrap-add the pitch-cycle waveforms such that the fundamental frequency and phoneme duration length of the speech unit are equal to the target fundamental frequency and the target phoneme duration length included in the input prosody information, thereby generating the speech waveform.

Figure 17:
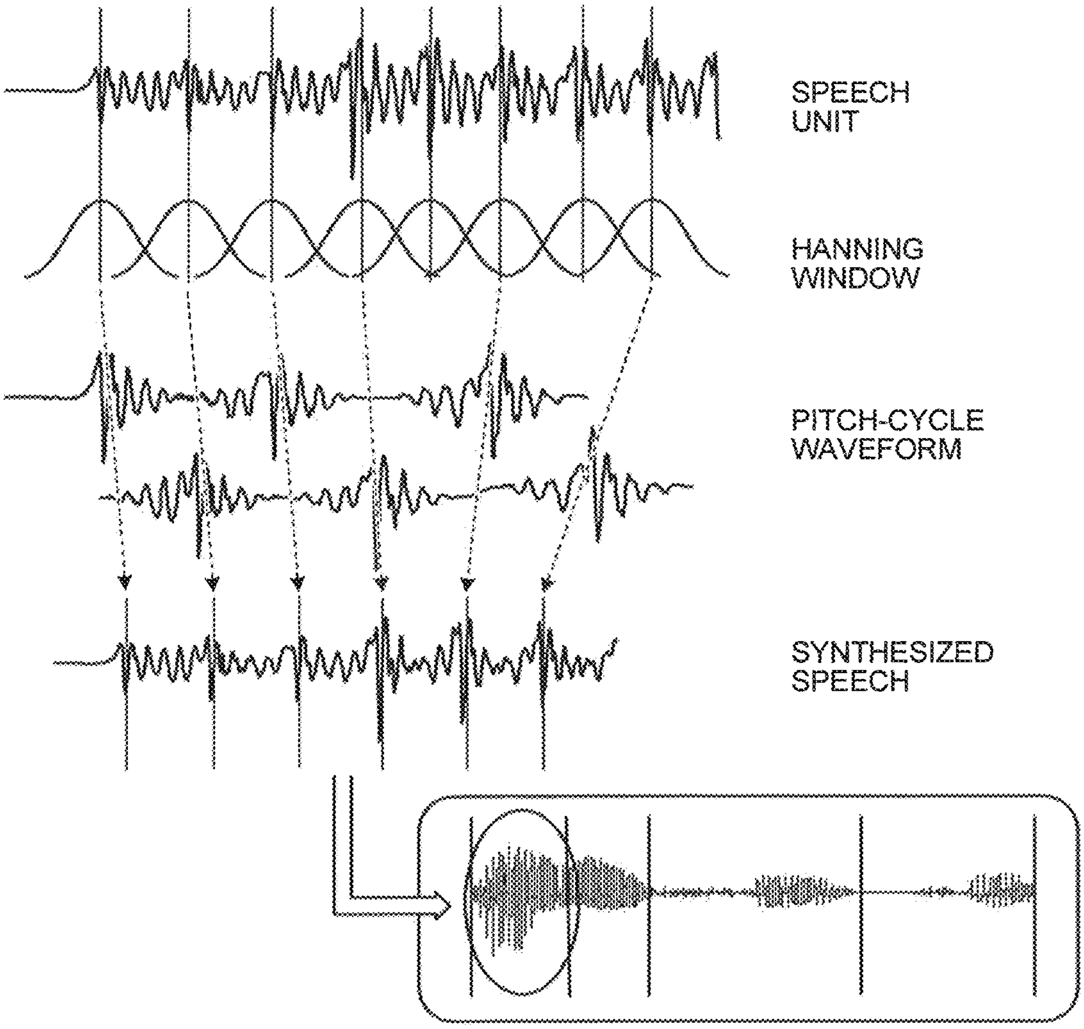
FIG. 17 is a diagram illustrating an example of the process of a modification and concatenation module of the speech synthesis module.

FIG. 17 is a diagram illustrating the process of the modification and concatenation module 132. FIG. 17 illustrates an example in which the speech waveform of a phoneme "a" in synthesized speech "a-i-sa-tsu" is generated.

In FIG. 17, a selected speech unit, a Hanning window for extracting a pitch-cycle waveform, a pitch-cycle waveform, and synthesized speech are illustrated in this order from the upper side. The vertical bar of the synthesized speech indicates a pitch mark, which is generated according to the target fundamental frequency and the target phoneme duration length included in the input prosody information. The modification and concatenation module 132 overwrap-adds the pitch-cycle waveforms extracted from the selected speech unit for each predetermined synthesis unit according to the pitch marks to modify the speech units, thereby changing the fundamental frequency and the phoneme duration length. Then, the modification and concatenation module 132 concatenates adjacent pitch-cycle waveforms to generate synthesized speech.

As described in detail above, the speech synthesis device according to the first example generates the speech unit database based on the speech unit set generated by adding the converted speech unit and the target speech unit and performs unit-selection-type speech synthesis using the speech unit database to generate synthesized speech corresponding to an arbitrary input sentence. Therefore, according to the speech synthesis device according to the first example, it is possible to generate a speech unit database with high coverages using the converted speech unit while reproducing the features of the target speech unit and thus generate synthesized speech. In addition, it is possible to obtain high-quality synthesized speech with high similarity to a target uttered voice from a small number of target speech units.

In the above-mentioned first example, in order to increase the rate of use of the target speech unit during voice synthesis, the converted phoneme category is determined based on the frequency, and only the converted speech unit corresponding to the converted phoneme category is added to the target speech unit to generate the speech unit set. However, the invention is not limited thereto. For example, a speech unit set including all of the converted speech units and the target speech unit may be generated, the speech unit database 133 may be created based on the speech unit set, and the unit selection module 131 may select the unit such that the rate at which the target speech unit is selected from the speech unit database 133 increases, that is, the target speech unit is preferentially used for the synthesized speech.

In this case, information indicating whether each speech unit is the target speech unit or the converted speech unit may be stored in the speech unit database 133 and a target speech unit cost which is reduced when the target speech unit is selected may be added as one of the sub-costs of the target cost. The following Expression (17) indicates the target speech unit cost, is 1 when the speech unit is the converted speech unit, and is 0 when the speech unit is the target speech unit:

$$C_6(u_i, u_{i-1}, t_i) = \begin{cases} 1 \ldots u_i & \text{is converted speech segment} \\ 0 \ldots u_i & \text{is target speech segment} \end{cases} \quad (17)$$

In this case, the unit selection module 131 adds the above-mentioned Expression (17) to the above-mentioned Expressions (11) to (14) to calculate a speech unit cost function represented by the above-mentioned Expression (18) and calculates the cost function represented by the above-mentioned Expression (16). A sub-cost weight $w_6$ is appropriately determined to select the units considering the degree of distortion between the speech unit and a target and a reduction in similarity to the target due to the use of the converted speech unit. In this way, it is possible to generate synthesized speech to which the features of the target uttered voice are applied.

In the above-mentioned first example, the waveform generating module 45 of the speech synthesis module 106 generates the synthesized speech using the unit-selection-type voice synthesis. However, the waveform generating module 45 may generate the synthesized speech using plural-unit-selection-and-fusion-type voice synthesis.

Figure 18:
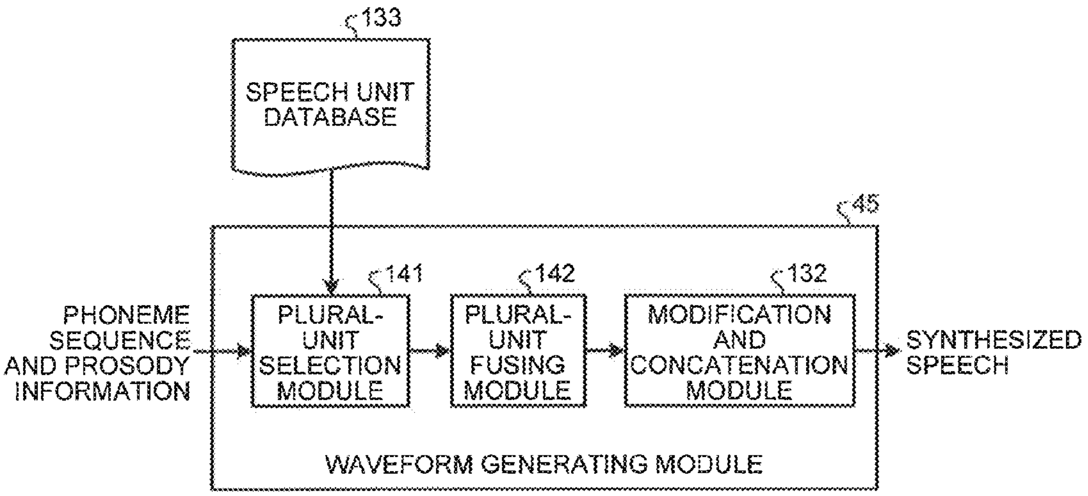
FIG. 18 is a block diagram illustrating the details of a waveform generating module of the speech synthesis module.

FIG. 18 is a block diagram illustrating the details of the waveform generating module 45 which generates synthesized speech using the plural-unit-selection-and-fusion-type voice synthesis. In this case, as illustrated in FIG. 18, the waveform generating module 45 includes a plural-unit selection module 141, a plural-unit fusing module 142, and a modification and concatenation module 132. The plural-unit selection module 141 selects a plurality of speech units which are used for the synthesized speech for each speech unit (synthesis unit) from the speech units stored in the speech unit database 133, based on the input phoneme sequence and prosody information. The plural-unit fusing module 142 fuses the selected plurality of speech units to generate a fused speech unit. The modification and concatenation module 132 performs a prosody modification and concatenation process on the fused speech unit generated by the plural-unit fusing module 142 according to the input prosody information, thereby generating the speech waveform of the synthesized speech.

First, the plural-unit selection module 141 selects an optimal speech unit sequence using a DP algorithm such that the value of the cost function represented by the above-mentioned Expression (16) is the minimum. Then, the plural-unit selection module 141 selects a plurality of speech units from the speech units of the same phoneme included in the speech unit database 133 in the ascending order of the value of the cost function, with the sum of the concatenation cost of the optimal speech units in the speech unit sections which are adjacent to each other in the front-rear direction and the target cost of the attribute input to the corresponding section.

The plurality of speech units selected by the plural-unit selection module 141 are fused by the plural-unit fusing module 142 to obtain a fused speech unit, which is a representative speech unit of the selected plurality of speech units. The fusion of the speech units by the plural-unit fusing module 142 can be performed by extracting the pitch-cycle waveform from each of the selected speech units, copying or deleting the number of extracted pitch-cycle waveforms to align the pitch-cycle waveforms with pitch marks which are generated from a target prosody, and averaging the pitch-cycle waveforms corresponding to the pitch marks in a time region. The modification and concatenation module 132 changes the prosody of the obtained fused speech unit and concatenates the obtained fused speech unit to other fused speech units. In this way, the speech waveform of the synthesized speech is generated.

It is confirmed that the plural-unit-selection-and-fusion-type speech synthesis can obtain synthesized speech more stable than that obtained by the unit-selection-type voice synthesis. Therefore, according to this structure, it is possible to perform speech synthesis that has very high similarity to a target uttered voice and high stability and is capable of obtaining a voice close to a natural voice.

SECOND EXAMPLE

Figure 19:
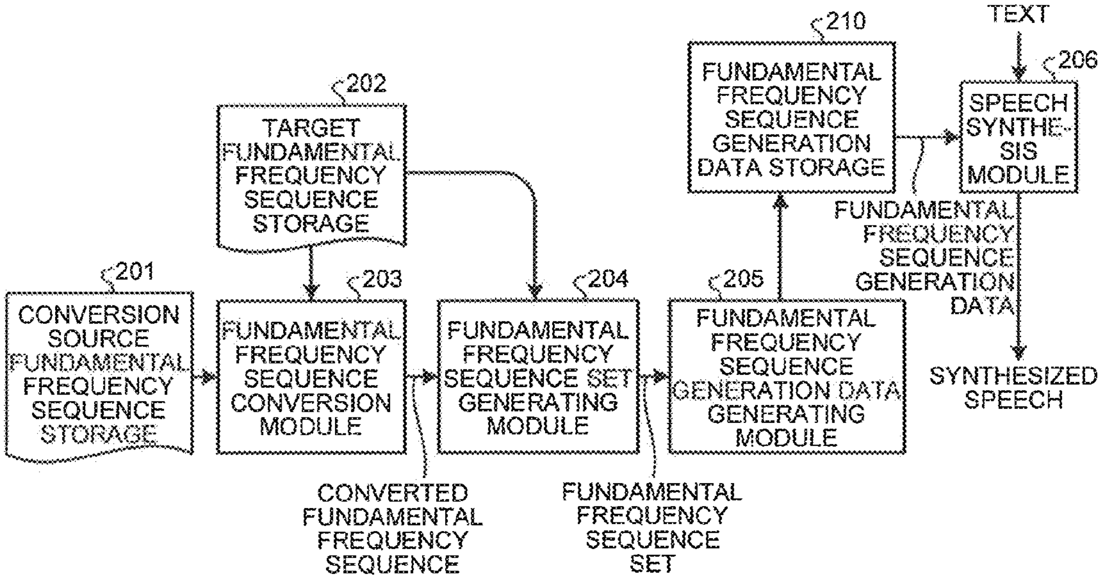
FIG. 19 is a block diagram illustrating a speech synthesis device according to a second example.

FIG. 19 is a block diagram illustrating a speech synthesis device according to a second example. As illustrated in FIG. 19, the speech synthesis device according to the second example includes a conversion source fundamental frequency sequence storage (second storage) 201, a target fundamental frequency sequence storage (first storage) 202, a fundamental frequency sequence conversion module (first generator) 203, a fundamental frequency sequence set generating module (second generator) 204, a fundamental frequency sequence generation data generating module (third generator) 205, a fundamental frequency sequence generation data storage 210, and a speech synthesis module (fourth generator) 206.

The conversion source fundamental frequency sequence storage 201 stores a fundamental frequency sequence (conversion source fundamental frequency sequence) of accentual phrase units obtained from an arbitrary uttered voice together with attribute information, such as the number of morae in the accentual phrase, an accent type, and an accentual phrase type (the position of the accentual phrase in a sentence).

The target fundamental frequency sequence storage 202 stores a fundamental frequency sequence (target fundamental frequency sequence) of accentual phrase units obtained from a target uttered voice together with attribute information, such as the number of morae in the accentual phrase, an accent type, and an accentual phrase type (the position of the accentual phrase in a sentence).

Figure 20:
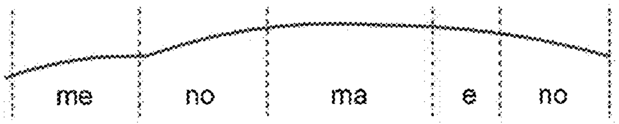
FIG. 20 is a diagram illustrating an example of a fundamental frequency sequence and attribute information.
Figure 20:
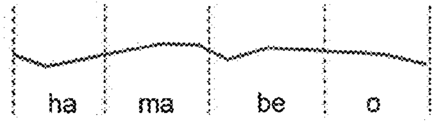
Figure 20:
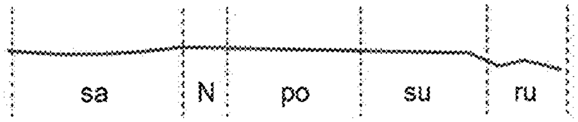

FIG. 20 illustrates a detailed example of the fundamental frequency sequence and the attribute information stored in the target fundamental frequency sequence storage 202 and the conversion source fundamental frequency sequence storage 201. The target fundamental frequency sequence storage 202 and the conversion source fundamental frequency sequence storage 201 store the fundamental frequency sequence of the accentual phrase units and the attribute information thereof. In the example illustrated in FIG. 20, as the attribute information of the fundamental frequency sequence, for example, the following information is stored: information about the mora boundary of the accentual phrase; and information about a mora sequence, the number of morae, an accent type, an accentual phrase type, and a part of speech. For example, in FIG. 20, the first fundamental frequency sequence (fundamental frequency sequence number 1, which is a fundamental frequency sequence extracted from a voice "me-no-ma-e-no", stores attribute information items, such as boundary information about each mora sequence, /me/no/ma/e/no/, which is a mora sequence, 5, which is the number of morae, and 3, which is an accent type (the number of morae is 5 and the accent type is 3), /the beginning of a sentence/ (the position of the accentual phrase position in the sentence or a breath group), which is an accentual phrase type, and /noun-postposition/, which is a part of speech.

The fundamental frequency sequence conversion module 203 converts the conversion source fundamental frequency sequence stored in the conversion source fundamental frequency sequence storage 201 so as to be close to the prosody of the target uttered voice, thereby generating a converted fundamental frequency sequence.

Figure 21:
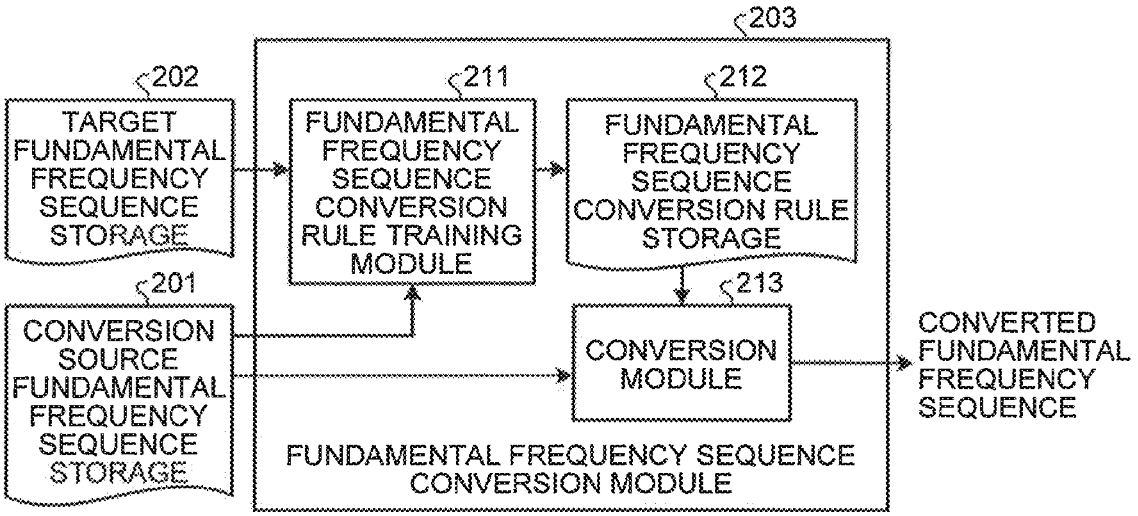
FIG. 21 is a block diagram illustrating an example of a fundamental frequency sequence conversion module.

FIG. 21 is a block diagram illustrating an example of the structure of the fundamental frequency sequence conversion module 203. As illustrated in FIG. 21, the fundamental frequency sequence conversion module 203 includes a fundamental frequency sequence conversion rule training module 211, a fundamental frequency sequence conversion rule storage 212, and a conversion module 213. The fundamental frequency sequence conversion rule training module 211 generates a conversion rule for converting a fundamental frequency sequence from the conversion source fundamental frequency sequence stored in the conversion source fundamental frequency sequence storage 201 and the target fundamental frequency sequence stored in the target fundamental frequency sequence storage 202 using training and stores the conversion rule in the fundamental frequency sequence conversion rule storage 212. The conversion module 213 applies the conversion rule stored in the fundamental frequency sequence conversion rule storage 212 to the conversion source fundamental frequency sequence to calculate the converted fundamental frequency sequence.

Figure 22:
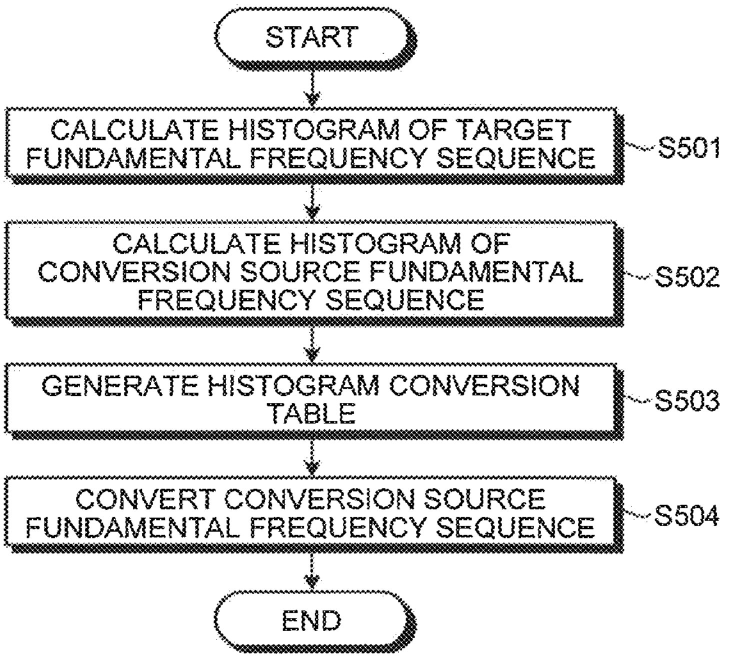
FIG. 22 is a flowchart illustrating an example of the process performed in the fundamental frequency sequence conversion module.

FIG. 22 is a flowchart illustrating an example of the process performed in the fundamental frequency sequence conversion module 203 and is also a flowchart when a histogram conversion method of converting a histogram of the conversion source fundamental frequency sequence so as to be aligned with a histogram of the target fundamental frequency sequence is applied.

As illustrated in FIG. 22, first, in Step S501, when histogram conversion is used to convert the fundamental frequency sequence, the fundamental frequency sequence conversion module 203 calculates the histogram of the target fundamental frequency sequence. Then, in Step S502, the fundamental frequency sequence conversion module 203 calculates the histogram of the conversion source fundamental frequency sequence. Then, in Step S503, the fundamental frequency sequence conversion module 203 generates a histogram conversion table based on the histograms calculated in Steps S501 and S502. Then, in Step S504, the fundamental frequency sequence conversion module 203 converts the conversion source fundamental frequency sequence based on the histogram conversion table generated in Step S503 and generates the converted fundamental frequency sequence.

Figure 23A:
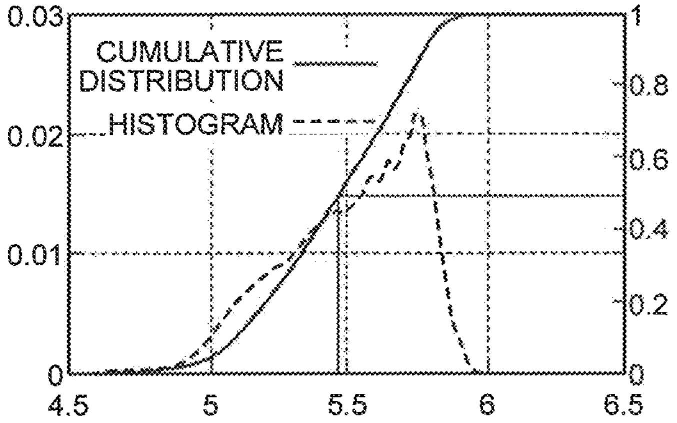
FIGS. 23A to 23C are diagrams illustrating histogram conversion by the fundamental frequency sequence conversion module.
Figure 23B:
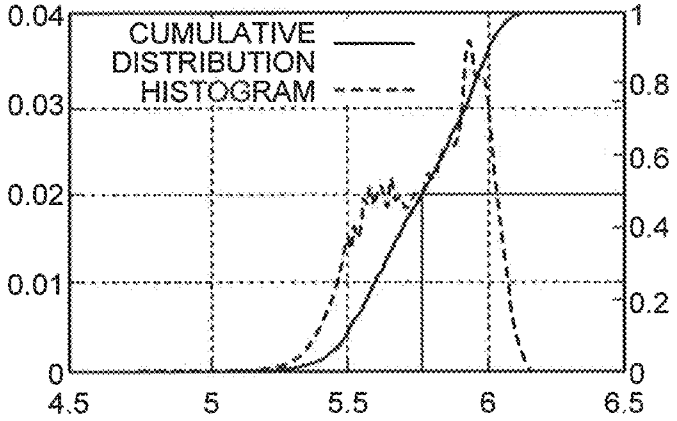
Figure 23C:
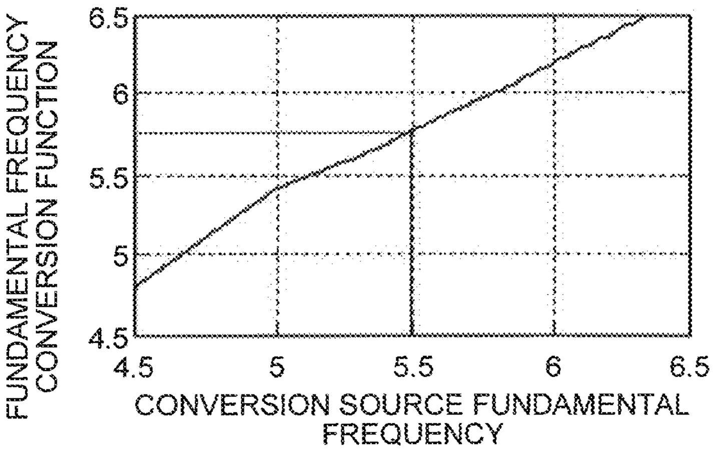

FIGS. 23A to 23C are diagrams illustrating histogram conversion by the fundamental frequency sequence conversion module 203 and illustrate the detailed examples of a histogram and a conversion function. FIG. 23A illustrates the histogram (conversion source histogram) and cumulative distribution of the conversion source fundamental frequency sequence. FIG. 23B illustrates the histogram (target histogram) and cumulative distribution of the target fundamental frequency sequence. FIG. 23C illustrates a fundamental frequency conversion function generated from the histograms.

As can be seen from the examples illustrated in FIGS. 23A to 23C, the target fundamental frequency sequence has a high fundamental frequency and a narrow range, as compared to the conversion source fundamental frequency sequence. The fundamental frequency conversion function illustrated in FIG. 23C converts the cumulative distribution of the conversion source fundamental frequency sequence so as to be aligned with the cumulative distribution of the target fundamental frequency sequence. As can be seen from FIG. 23A, the center value of the cumulative distribution of the conversion source fundamental frequency sequence is 5.47. As can be seen from FIG. 23B, the center value of the cumulative distribution of the target fundamental frequency sequence is 5.76. As can be seen from FIG. 23C, the values are converted by the fundamental frequency conversion function so as to be associated with each other.

The histogram conversion table is made by extracting the input and output of the fundamental frequency conversion function illustrated in FIG. 23C at a predetermined interval and tabling the input and output. The histogram conversion table is generated as a conversion rule by the fundamental frequency sequence conversion rule training module 211 in Step S503 of the flowchart illustrated in FIG. 22 and is then stored in the fundamental frequency sequence conversion rule storage 212.

When the conversion source fundamental frequency sequence is converted, the conversion module 213 selects k satisfying $x^t_k \leq x < x^t_{k+1}$ for an input x from the conversion table and calculates an output y using linear interpolation represented by the following Expression (18):

$$y = \frac{y^t_{k+1} - y^t_k}{x^t_{k+1} - x^t_k}(x - x^t_k) + y^t_k \tag{18}$$

where $x^t$ and $y^t$ indicate an input entry and an output entry of the conversion table, respectively.

In Step S504 of the flowchart illustrated in FIG. 22, the conversion source fundamental frequency sequence is converted by the generated conversion rule to obtain a converted fundamental frequency sequence.

Figure 24A:
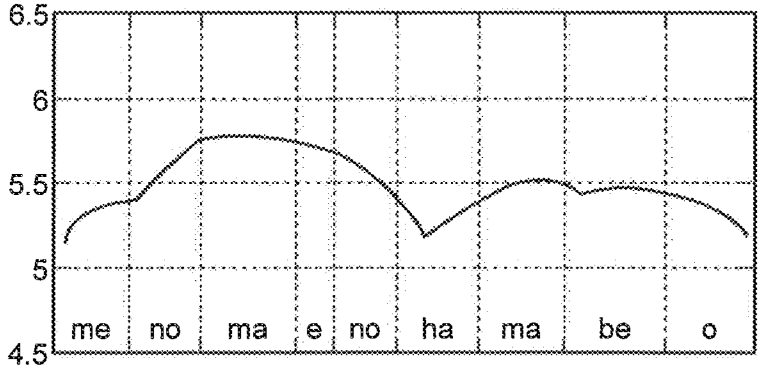
FIGS. 24A and 24B are diagrams illustrating a converted fundamental frequency sequence obtained by converting a conversion source fundamental frequency sequence.
Figure 24B:
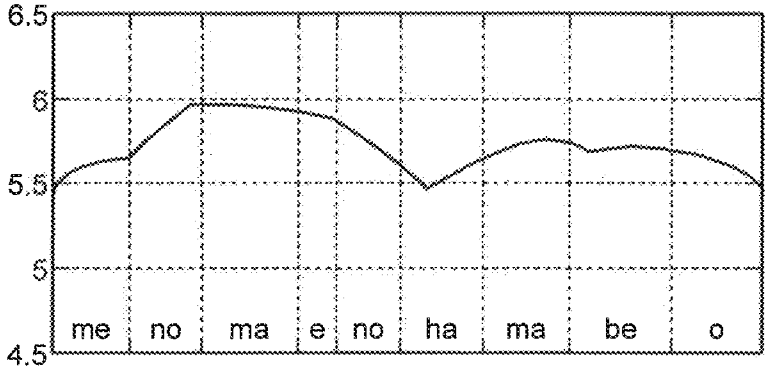

FIGS. 24A and 24B are diagrams illustrating an example of the converted fundamental frequency sequence obtained by actually converting the conversion source fundamental frequency sequence. FIG. 24A illustrates the schematic of the conversion source fundamental frequency sequence with respect to a phrase "me-no-ma-e-no-ha-ma-be-o" and FIG. 24B illustrates the schematic shape of the converted fundamental frequency sequence obtained by converting the conversion source fundamental frequency sequence illustrated in FIG. 24A.

As can be seen from the example illustrated in FIGS. 24A and 24B, the fundamental frequency is increased and the range of the value is converted by histogram conversion. In addition, in this example, since duration length is also converted, the conversion source fundamental frequency sequence is also modified in the time direction.

An example of the conversion rule to which a conversion method using histogram conversion is applied has been described above. However, the conversion rule for converting the conversion source fundamental frequency sequence is not limited thereto. For example, a conversion method which aligns an average value and a standard deviation with the target fundamental frequency sequence may be used.

Figure 25:
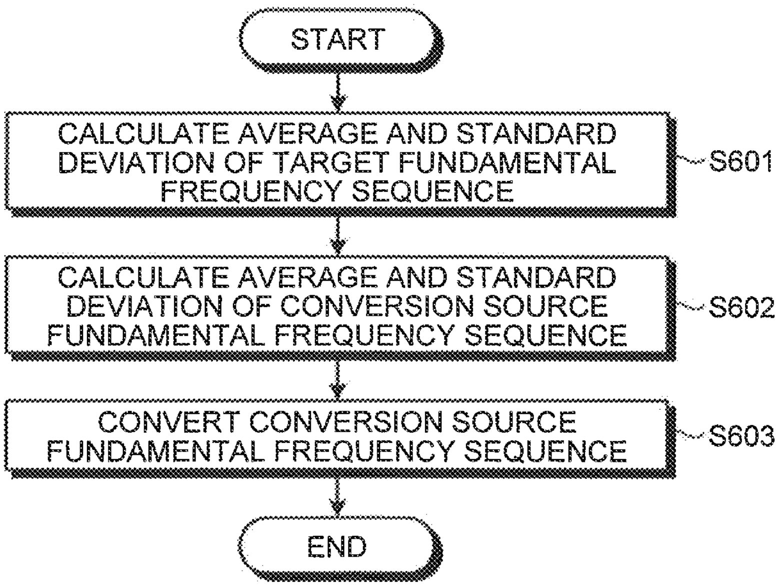
FIG. 25 is a flowchart illustrating another example of the process performed in the fundamental frequency sequence conversion module.

FIG. 25 is a flowchart illustrating another example of the process performed in the fundamental frequency sequence conversion module 203 and is also a flowchart when a conversion method which performs conversion to align the average value and the standard deviation of the conversion source fundamental frequency sequence with the target fundamental frequency sequence is applied.

As illustrated in FIG. 25, first, in Step S601, when the average value and the standard deviation are used to convert the fundamental frequency sequence, the fundamental frequency sequence conversion module 203 calculates the average and standard deviation of the target fundamental frequency sequence. Then, in Step S602, the fundamental frequency sequence conversion module 203 calculates the average and standard deviation of the conversion source fundamental frequency sequence. Then, in Step S603, the fundamental frequency sequence conversion module 203 converts the conversion source fundamental frequency sequence from the values calculated in Steps S601 and S602, using the following Expression (19):

$$y = \frac{\sigma_y}{\sigma_x}(x - \mu_x) + \mu_y \quad (19)$$

where $\mu_x$ and $\mu_y$ are the averages of the conversion source fundamental frequency sequence and the target fundamental frequency sequence and $\sigma_x$ and $\sigma_y$ are the standard deviation thereof.

As the fundamental frequency sequence conversion method, the following methods may be used: a method of classifying the fundamental frequency sequences for each accentual phrase type and performing histogram conversion or conversion based on the average and standard deviation for each of the classified fundamental frequency sequences; and a method of classifying the fundamental frequency sequences using, for example, VQ, GMM, and a decision tree and changing the fundamental frequency sequence for each classified fundamental frequency sequence.

The fundamental frequency sequence set generating module 204 adds the converted fundamental frequency sequence generated by the fundamental frequency sequence conversion module 203 and the target fundamental frequency sequence stored in the target fundamental frequency sequence storage 202 to generate a fundamental frequency sequence set including the target fundamental frequency sequence and the converted fundamental frequency sequence.

The fundamental frequency sequence set generating module 204 may add all of the converted fundamental frequency sequences generated by the fundamental frequency sequence conversion module 203 to the target fundamental frequency sequence to generate the fundamental frequency sequence set, or it may add some of the converted fundamental frequency sequences to the target fundamental frequency sequence to generate the fundamental frequency sequence set.

Figures 26, 27:
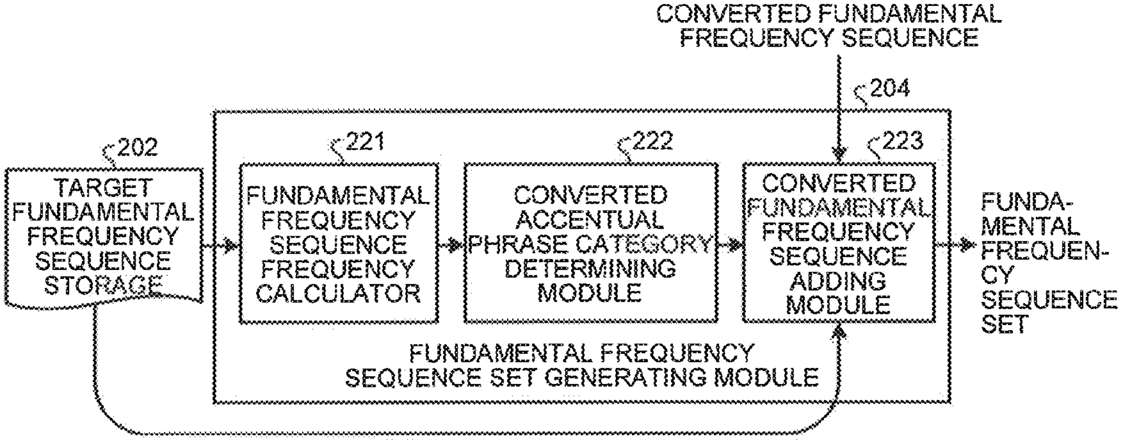
FIG. 26 is a block diagram illustrating an example of a fundamental frequency sequence set generating module.
FIG. 27 is a diagram illustrating an example of an accentual phrase frequency table.

FIG. 26 is a block diagram illustrating an example of the structure of the fundamental frequency sequence set generating module 204 which adds some of the converted fundamental frequency sequences to the target fundamental frequency sequence to generate the fundamental frequency sequence set. In this example, the fundamental frequency sequence set generating module 204 generates the fundamental frequency sequence set based on the frequency of the fundamental frequency sequence for each of the classified accentual phrases and includes a fundamental frequency sequence frequency calculator (calculator) 221, a converted accentual phrase category determining module (determining module) 222, and a converted fundamental frequency sequence adding module (adding module) 223, as illustrated in FIG. 26.

The fundamental frequency sequence frequency calculator 221 calculates the number of target fundamental frequency sequences for each classified accentual phrase (accentual phrase category) in the target fundamental frequency sequence storage 202 and calculates a category frequency for each accentual phrase category. For example, among the attribute information items illustrated in FIG. 20, the accentual phrase type, the number of morae, and the accent type are used to classify the accentual phrases.

The converted accentual phrase category determining module 222 determines the accentual phrase category (converted accentual phrase category) of the converted fundamental frequency sequence to be added to the target fundamental frequency sequence, based on the calculated category frequency for each accentual phrase category. In order to determine the converted accentual phrase category, for example, a method may be used which determines the accentual phrase category with a category frequency less than a predetermined value to be the converted accentual phrase category.

The converted fundamental frequency sequence adding module 223 adds the converted fundamental frequency sequence corresponding to the determined converted accentual phrase category to the target fundamental frequency sequence to generate the fundamental frequency sequence set.

FIG. 27 is a diagram illustrating an example of an accentual phrase frequency table indicating the category frequency for each accentual phrase category which is calculated by the fundamental frequency sequence frequency calculator 221. FIG. 27 illustrates the number of accentual phrases included in one target sentence, 10 target sentences, 50 target sentences, and 600 conversion source sentences. The accentual phrases are classified into a plurality of accentual phrase categories by the accentual phrase type, the number of morae, and the accent type and the number of fundamental frequency sequences corresponding to each accentual phrase category is represented as the number of accentual phrases. For example, /the beginning of a sentence-2-1/ indicates that an accentual phrase has an accentual phrase type "the beginning of a sentence", includes two morae, and has an accent type "1".

For example, the converted accentual phrase category determining module 222 determines the accentual phrase category in which the number of accentual phrases illustrated in FIG. 27 is less than a predetermined value to be the converted accentual phrase category. For example, when the predetermined value is determined to be 5, the converted accentual phrase category determining module 222 determines all of the accentual phrase categories to be the converted accentual phrase categories in the case of one target sentence and 10 target sentences and determines /the beginning of a sentence-2-1/, /the beginning of a sentence-7-0/, /the beginning of a sentence-3-1/, and /the beginning of a sentence-5-4/to be the converted accentual phrase category in the case of 50 target sentences.

The converted fundamental frequency sequence adding module 223 adds the converted fundamental frequency sequence corresponding to the determined converted accentual phrase category to the target fundamental frequency sequence to generate the fundamental frequency sequence set. When the converted fundamental frequency sequence is added to the target fundamental frequency sequence, the converted fundamental frequency sequence adding module 223 may add all of the converted accentual phrase categories corresponding to the converted fundamental frequency sequence to the target fundamental frequency sequence, or it may add some representative converted fundamental frequency sequences among the converted fundamental frequency sequences corresponding to the converted accentual phrase category to the converted fundamental frequency sequence to generate the target fundamental frequency sequence. In addition, all of the converted fundamental frequency sequences generated by converting all of the conversion source fundamental frequency sequences extracted from all sentences including the converted accentual phrase category or all breath groups may be added to the target fundamental frequency sequence.

Here, the accentual phrase type, the number of morae, and the accent type are used as the attribute information to determine the accentual phrase category and the category frequency is calculated for each accentual phrase category. However, the following method may be used: a method of clustering the conversion source fundamental frequency sequences to determine the classification of the categories; or a method of determining the classification of the categories using detailed attribute information, such as a part of speech. In addition, a set of some morae and accent types may be treated as the same accentual phrase category.

The fundamental frequency sequence generation data generating module 205 generates fundamental frequency sequence generation data used to generate the prosody of the synthesized speech based on the fundamental frequency sequence set generated by the fundamental frequency sequence set generating module 204. The fundamental frequency sequence generation data includes fundamental frequency pattern selection data and offset estimation data. The fundamental frequency sequence generation data generating module 205 trains a fundamental frequency pattern code book, a rule for selecting the fundamental frequency pattern (fundamental frequency pattern selection data and an offset estimation rule (offset estimation data) from the fundamental frequency sequence set generated by the fundamental frequency sequence set generating module 204 and generates the fundamental frequency sequence generation data. The fundamental frequency sequence generation data is an example of speech synthesis data, which is data used for speech synthesis by the speech synthesis module 206 and is stored in the fundamental frequency sequence generation data storage 210.

Figure 28:
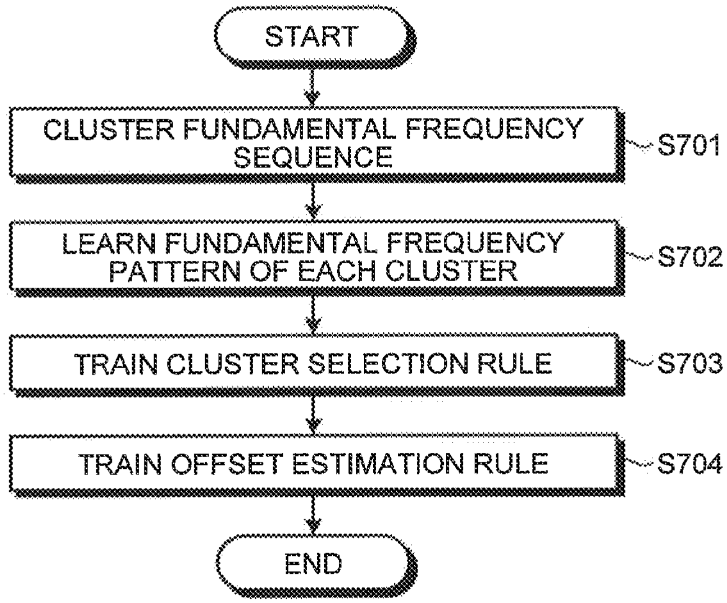
FIG. 28 is a flowchart illustrating the process performed in a fundamental frequency sequence generation data generating module.

FIG. 28 is a flowchart illustrating the process performed in the fundamental frequency sequence generation data generating module 205. As illustrated in FIG. 28, first, in Step S701, the fundamental frequency sequence generation data generating module 205 clusters the fundamental frequency sequences (the target fundamental frequency sequence and the converted fundamental frequency sequence) included in the fundamental frequency sequence set. Then, in Step S702, the fundamental frequency sequence generation data generating module 205 calculates the fundamental frequency pattern of each cluster obtained in Step S701 using training. In this way, the fundamental frequency pattern code book is generated. Then, in Step S703, the fundamental frequency sequence generation data generating module 205 trains a cluster selection rule. Then, in Step S704, the fundamental frequency sequence generation data generating module 205 trains the offset estimation rule. The fundamental frequency sequence generation data is generated by the above-mentioned process. A detailed example of the fundamental frequency sequence generation data will be described in detail below together with a detailed example of a process of the fundamental frequency sequence of the synthesized speech using the fundamental frequency sequence generation data.

The speech synthesis module 206 generates synthesized speech corresponding to input text using the fundamental frequency sequence generation data generated by the fundamental frequency sequence generation data generating module 205. Specifically, in the speech synthesis module 206 generates the synthesized speech as follows: the process of the text analysis module 43 and the duration length generating process of the prosody generating module 44 illustrated in FIG. 4 are performed on the input text; the prosody generating module 44 generates the fundamental frequency sequence using the fundamental frequency sequence generation data generated by the fundamental frequency sequence generation data generating module 205; and the waveform generating module 45 generates the waveform using the generated fundamental frequency sequence.

Figure 29:
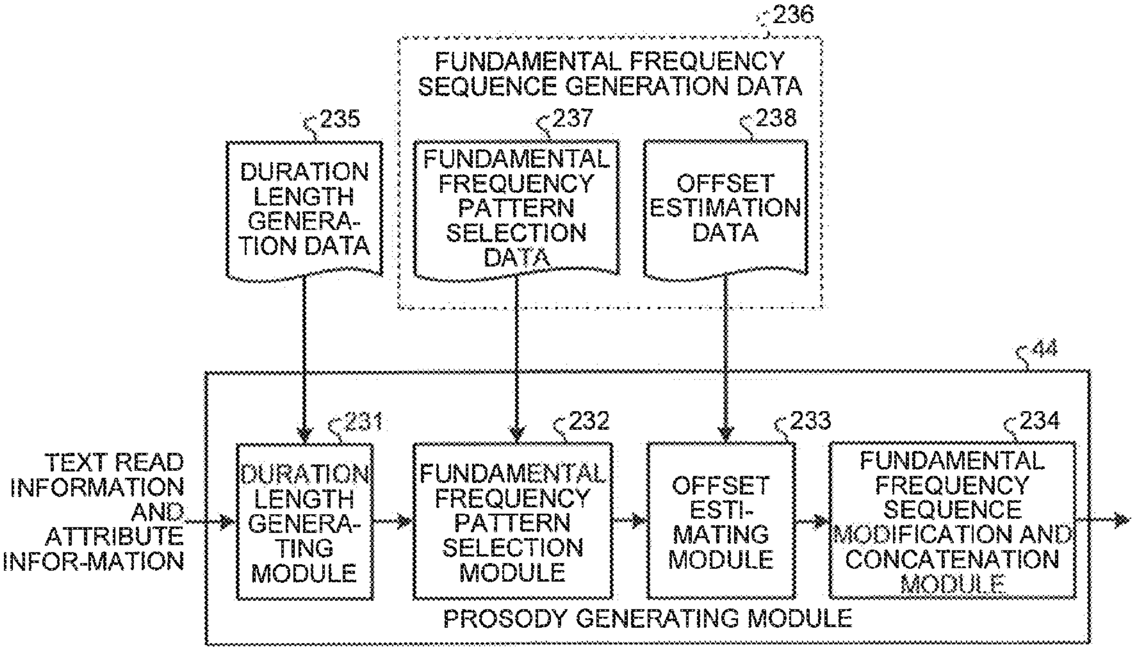
FIG. 29 is a block diagram illustrating the details of a prosody generating module of the speech synthesis module.

FIG. 29 is a block diagram illustrating the details of the prosody generating module 44 of the speech synthesis module 206. As illustrated in FIG. 29, the prosody generating module 44 of the speech synthesis module 206 includes a duration length generating module 231, a fundamental frequency pattern selection module 232, an offset estimating module 233, and a fundamental frequency sequence modification and concatenation module 234.

The duration length generating module 231 estimates the duration length of each phoneme in the synthesized speech using duration length generation data 235 which is prepared in advance, based on the read information and attribute information of the input text processed by the text analysis module 43.

The fundamental frequency pattern selection module 232 selects the fundamental frequency pattern corresponding to each accentual phrase of the synthesized speech using fundamental frequency pattern selection data 237 included in fundamental frequency sequence generation data 236, based on the read information and attribute information of the input text processed by the text analysis module 43.

The offset estimating module 233 estimates an offset using offset estimation data 238 included in the fundamental frequency sequence generation data 236, based on the read information and attribute information of the input text processed by the text analysis module 43.

The fundamental frequency sequence modification and concatenation module 234 modifies the fundamental frequency patterns selected by the fundamental frequency pattern selection module 232 according the duration length of the phoneme estimated by the duration length generating module 231 and the offset estimated by the offset estimating module 233 and concatenates the fundamental frequency patterns to generate the fundamental frequency sequence of the synthesized speech corresponding to the input text.

Here, when the selected fundamental frequency pattern is p, the offset is b, and a matrix indicating the time warping of the duration length is D, the fundamental frequency pattern p of the generated accentual phrase is represented by the following Expression (20):

$$p=Dc+bi \tag{20}$$

When the order of p is N and the order of c is L, D is a L×N matrix, b is a constant, and i is a vector having an L-order element as 1. N and L are calculated from the number of morae and the score of the fundamental frequency for each mora, respectively. In this case, an error e between training data r and the generated fundamental frequency pattern p is represented by the following Expression (21):

$$e=(r-Dc-bi)^T(r-Dc-bi) \tag{21}$$

In Step S701 of the flowchart illustrated in FIG. 28 which indicates a process for generating the fundamental frequency sequence generation data, the fundamental frequency sequences of each accentual phrase included in the fundamental frequency sequence set are clustered such that an approximation error represented by the following Expression (22) is minimized. In Step S702, an equation represented by the following Expression (22) is solved to calculate the fundamental frequency pattern such that the sum of errors in the cluster is minimized:

$$\frac{\partial}{\partial c}\sum_i e_i = 0_f \tag{22}$$

$$(\Sigma D_i^T D_i)c = \Sigma D_i^T (r - Dc - bi)$$

The selection of the fundamental frequency pattern and the estimation of the offset can be performed by a quantification method I. The quantification method I estimates a value from the category of each attribute, as represented by the following Expression (23):

$$y = \sum \sum_m a_{km}\delta(k, m) \tag{23}$$

$$\delta(k, m) = \begin{cases} 1 & \text{corresponding to category } m \text{ of attribute } k \\ 0 & \text{others} \end{cases}$$

where $a_{km}$ is a prediction coefficient.

The prediction value is calculated by the sum of the coefficients $a_k$ when the input attributes correspond to each other.

The fundamental frequency pattern can be selected based on the prediction of the error. The error between the training data r and the fundamental frequency pattern of each cluster is calculated by the above-mentioned Expression (21) and a prediction coefficient for predicting the error is calculated from the attribute of the training data r in Step S703 of FIG. 28. The coefficient $a_{km}$ is calculated such that the error between the actual error and the prediction error is minimized. In this way, the prediction coefficient for the error of the fundamental frequency pattern of each cluster is calculated and the rule for selecting the cluster included in the fundamental frequency pattern selection data 237 is obtained.

The offset is a value for moving the entire fundamental frequency pattern of each accentual and is a fixed value. The offset can be estimated by the quantification method I represented by the above-mentioned Expression (23). The maximum value or average value of each accentual phrase is used as the offset value of the training data r and is estimated by the above-mentioned Expression (23). In this case, the prediction coefficient $a_{km}$ of the above-mentioned Expression (23) is the offset estimation rule (offset estimation data 238) and the coefficient is calculated such that the error between the offset of the training data r and the prediction value is the minimum in Step S704 of FIG. 28.

In the prosody generating module 44 of the speech synthesis module 206, the fundamental frequency pattern selection module 232 predicts the error of the cluster corresponding to each fundamental frequency pattern for the input attribute using the quantification method I of the fundamental frequency pattern selection data 237 and selects the fundamental frequency pattern of the cluster with the minimum prediction error. Then, the offset estimating module 233 estimates the offset using the quantification method I based on the prediction coefficient, which is offset estimation data 238. Then, the fundamental frequency sequence modification and concatenation module 234 generates the fundamental frequency of the accentual phrase using the above-mentioned Expression (20) based on the obtained fundamental frequency pattern c, the obtained offset b, and a modification matrix D calculated from the duration length, and smoothes an adjacent accentual phrase or applies a process of raising a voice at the end of phrase, such as a question. In this way, the fundamental frequency sequence of the synthesized speech corresponding to the input text is generated.

An example in which the fundamental frequency pattern is selected based on error prediction has been described above. However, the pattern may be selected based on a decision tree. In this case, in Step S701 of FIG. 28 in which the fundamental frequency sequences are clustered, the decision tree is constructed. When the decision tree is constructed, first, questions which divide each attribute into two parts are prepared in advance and all of the fundamental frequency sequences of the accentual phrase included in the fundamental frequency sequence set are used as training data for a root node. Then, the question is selected such that the sum of errors when each question is applied to each leaf node and the fundamental frequency sequence is divided into two parts (errors represented by the above-mentioned Expression (21)) is the minimum. Then, the question is applied to generate a two-sentence child node. The selection of the question and the leaf node which has the smallest sum of error when it is divided among all of the leaf nodes is repeatedly performed to generate a two-sentence tree. The division of the two-sentence tree is stopped under predetermined stop conditions, thereby clustering the fundamental frequency sequences.

Then, in Step S702, the fundamental frequency pattern corresponding to each leaf node is calculated by the above-mentioned Expression (22). Since the question of each node of the decision tree is a cluster selection rule, the question is stored as the fundamental frequency pattern selection data 237 in Step S703. In Step S704, the offset estimation rule is calculated as described above and is stored as offset estimation data. The decision tree, the fundamental frequency pattern, and the offset estimation rule which are generated in this way are the fundamental frequency sequence generation data 236.

In this case, in the prosody generating module 44 of the speech synthesis module 206, the fundamental frequency pattern selection module 232 selects the leaf node through the decision tree generated as the fundamental frequency pattern selection data of the fundamental frequency sequence generation data 236 and selects the fundamental frequency pattern corresponding to the leaf node. Then, the offset estimating module 233 estimates the offset and the fundamental frequency sequence modification and concatenation module 234 generates the fundamental frequency sequence corresponding to the selected fundamental frequency pattern, the offset, and the duration length.

As described in detail above, the speech synthesis device according to the second example generates the fundamental frequency sequence generation data based on the fundamental frequency sequence set obtained by adding the converted fundamental frequency sequence and the target fundamental frequency sequence and inputs the fundamental frequency sequence generated using the fundamental frequency sequence generation data to the waveform generating module 45, thereby generating synthesized speech corresponding to an arbitrary input sentence. Therefore, according to the speech synthesis device of the second example, it is possible to generate the fundamental frequency sequence generation data with high coverages using the converted fundamental frequency sequence, while reproducing the features of the target fundamental frequency sequence and thus generate synthesized speech. It is possible to obtain high-quality synthesized speech with high similarity to the target uttered voice from a small number of target fundamental frequency sequences.

In the above-mentioned second example, in order to increase the rate at which the target fundamental frequency sequence is used during speech synthesis, the converted accentual phrase category is determined based on the frequency and only the converted fundamental frequency sequence corresponding to the converted accentual phrase category is added to the target fundamental frequency sequence to generate the fundamental frequency sequence set. However, the invention is not limited thereto. For example, a fundamental frequency sequence set including all of the converted fundamental frequency sequences and the target fundamental frequency sequence may be generated and a weighted error which is set such that a weight for the converted fundamental frequency sequence is less than that for the target fundamental frequency sequence may be used to generate the fundamental frequency sequence generation data, when the fundamental frequency sequence generation data is generated based on the fundamental frequency sequence set. That is, as an error measure when the fundamental frequency sequence generation data is generated, an error measure which increases the weight for the target fundamental frequency sequence is used. In this way, it is possible to generate the fundamental frequency sequence generation data with high coverages using the converted fundamental frequency sequence, while reproducing the features of the target fundamental frequency sequence.

In the above-mentioned second example, the converted fundamental frequency sequence adding module 223 of the fundamental frequency sequence set generating module 204 adds the converted fundamental frequency sequence corresponding to the converted accentual phrase category which is determined by the converted accentual phrase category determining module 222 among the converted fundamental frequency sequences generated by the fundamental frequency sequence conversion module 203 to the target fundamental frequency sequence to generate the fundamental frequency sequence set. However, first, after the converted accentual phrase category determining module 222 determines the converted accentual phrase category, the fundamental frequency sequence conversion module 203 converts the conversion source fundamental frequency sequence corresponding to the converted accentual phrase category to generate the converted fundamental frequency sequence, and the converted fundamental frequency sequence adding module 223 adds the converted fundamental frequency sequence to the target fundamental frequency sequence to generate the fundamental frequency sequence set. In this way, it is possible to increase the processing speed, as compared to a case in which all of the conversion source fundamental frequency sequences are converted in advance.

THIRD EXAMPLE

Figures 30, 31:
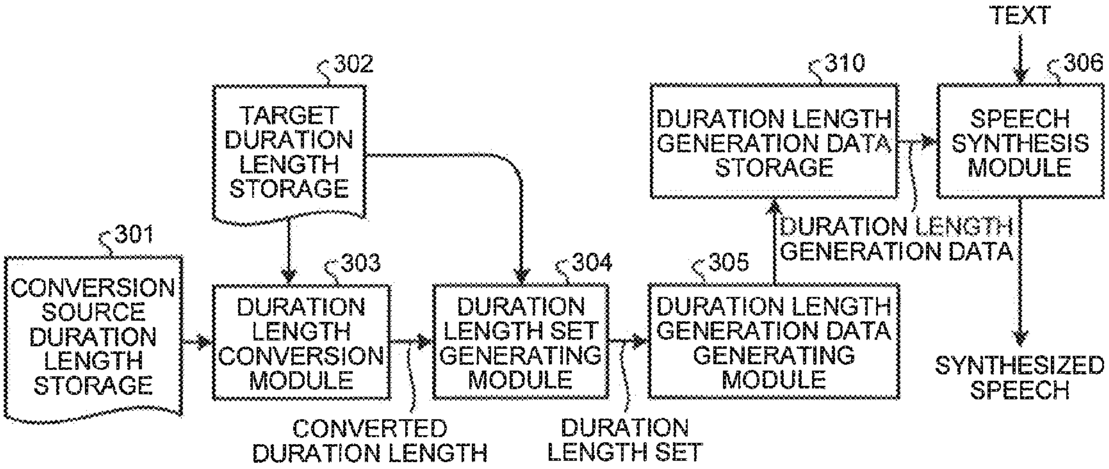
FIG. 30 is a block diagram illustrating a speech synthesis device according to a third example.
FIG. 31 is a diagram illustrating an example of duration length and attribute information.

FIG. 30 is a block diagram illustrating a speech synthesis device according to a third example. As illustrated in FIG. 30, the speech synthesis device according to the third example includes a conversion source duration length storage (second storage) 301, a target duration length storage (first storage) 302, a duration length conversion module (first generator) 303, a duration length set generating module (second generator) 304, a duration length generation data generating module (third generator) 305, a duration length generation data storage 310, and a speech synthesis module (fourth generator) 306.

The conversion source duration length storage 301 stores the duration length (conversion source duration length) of a phoneme obtained from an arbitrary uttered voice together with attribute information, such as a phoneme type or phonemic environment information. When the duration length is controlled in a phoneme unit, conversion source duration length is the length of a phoneme section and is stored together with attribute information, such as a phoneme name, which is the phoneme type, an adjacent phoneme name, which is the phonemic environment information, and a position in a sentence.

The target duration length storage 302 stores the duration length (target duration length) of a phoneme obtained from a target uttered voice together with the attribute information such as the phoneme type or the phonemic environment information. When the duration length is controlled in a phoneme unit, target duration length is the length of the phoneme section and is stored together with the attribute information, such as a phoneme name, which is the phoneme type, an adjacent phoneme name, which is the phonemic environment information, and a position in the sentence.

FIG. 31 illustrates an example of the duration length and the attribute information stored in the target duration length storage 302 and the conversion source duration length storage 301. In the example illustrated in FIG. 31, a phoneme with phoneme duration length number 1 is a unit of /a/ at the beginning of the sentence, a right phoneme thereof is silence /SIL/, a right phoneme thereof is /n/, and the duration length thereof is 112.2 msec.

The duration length conversion module 303 converts the conversion source duration length stored in the conversion source duration length storage 301 so as to be close to the prosody of the target uttered voice, thereby generating converted duration length. Similarly to the fundamental frequency sequence conversion module 203 according to the second example, the duration length conversion module 303 can convert the conversion source duration length using histogram conversion (the above-mentioned Expression (18)) or average and standard deviation conversion (the above-mentioned Expression (19)) to generate the converted duration length.

Figure 32:
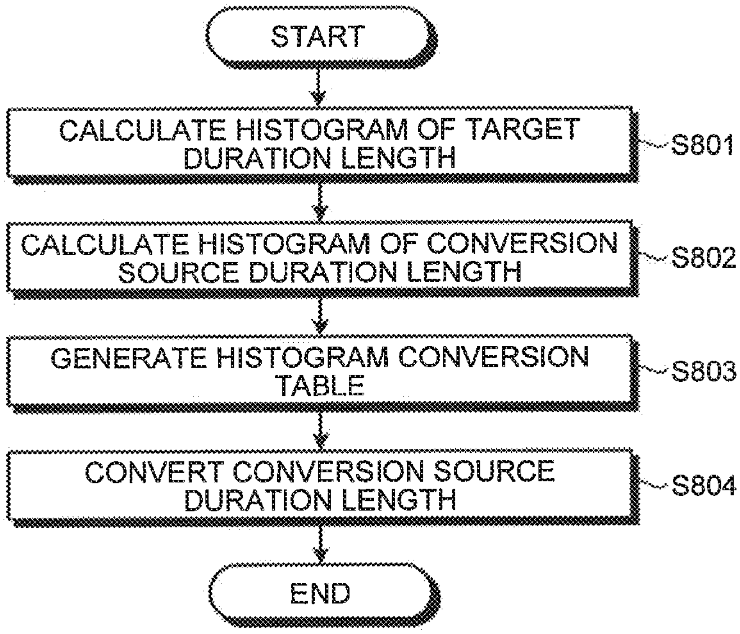
FIG. 32 is a flowchart illustrating an example of the process performed in a duration length conversion module.

FIG. 32 is a flowchart illustrating an example of the process performed in the duration length conversion module 303 and is also a flowchart when a histogram conversion method which converts the histogram of the conversion source duration length so as to be aligned with the histogram of the target duration length is applied.

When the duration length is converted by histogram conversion, first, in Step S801, the duration length conversion module 303 calculates the histogram of the target duration length, as illustrated in FIG. 32. Then, in Step S802, the duration length conversion module 303 calculates the histogram of the conversion source duration length. Then, in Step S803, the duration length conversion module 303 generates a histogram conversion table based on the histograms calculated in Steps S801 and S802. Then, in Step S804, the duration length conversion module 303 converts the conversion source duration length based on the histogram conversion table generated in Step S803 to generate the converted duration length.

When an average value and a standard deviation are used to convert the duration length, the duration length conversion module 303 calculates the average and standard deviation of each of the target duration length and the conversion source duration length and converts the conversion source duration length from the calculated values using the above-mentioned Expression (19).

The duration length set generating module 304 adds the converted duration length generated by the duration length conversion module 303 and the target duration length stored in the target duration length storage 302 to generate a duration length set including the target duration length and the converted duration length.

The duration length set generating module 304 may add all of the converted duration lengths generated by the duration length conversion module 303 and the target duration length to generate the duration length set, or it may add some of the converted duration lengths to the target duration length to generate the duration length set.

Figure 33:
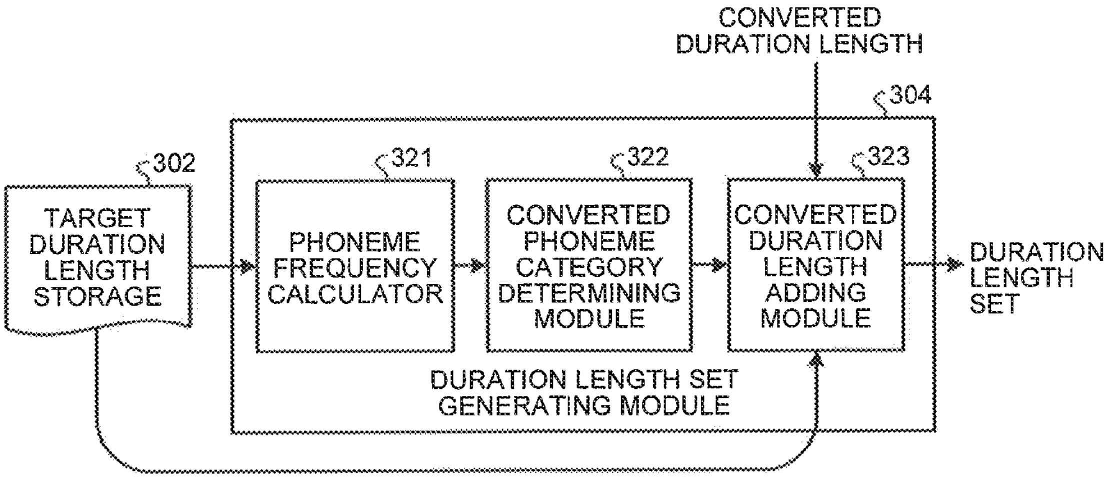
FIG. 33 is a block diagram illustrating an example of a duration length set generating module.

FIG. 33 is a block diagram illustrating an example of the structure of the duration length set generating module 304 which adds some of the converted duration lengths to the target duration length to generate the duration length set. The duration length set generating module 304 has a structure which uses a phoneme name indicating a phoneme type as the attribute information of the duration length and includes a phoneme frequency calculator (calculator) 321, a converted phoneme category determining module (determining module) 322, and a converted duration length adding module (adding module) 323, as illustrated in FIG. 33.

The phoneme frequency calculator 321 calculates the number of target duration lengths for each phoneme category in the target duration length storage 302 and calculates a category frequency for each phoneme category. For example, among the attribute information items illustrated in FIG. 31, the phoneme name indicating the phoneme type is used to calculate the category frequency for each phoneme category.

The converted phoneme category determining module 322 determines a converted phoneme category, which is the category of the converted duration length to be added to the target duration length, based on the calculated category frequency for each phoneme category. In order to determine the converted phoneme category, for example, a method may be used which determines a phoneme category with a category frequency less than a predetermined value to be the converted phoneme category.

The converted duration length adding module 323 adds the converted duration length corresponding to the determined converted phoneme category to the target duration length to generate the duration length set.

In this example, the category frequency for each phoneme category is calculated using the phoneme name indicating the phoneme type as the attribute information. However, the category frequency for each phoneme category may be calculated using a phoneme name and a phonemic environment as the attribute information. As illustrated in FIG. 31, the target duration length storage 302 and the conversion source duration length storage 301 also store an adjacent phoneme name, which is phonemic environment information, and a position in a sentence as the attribute information of the duration length. Therefore, it is possible to calculate the category frequency for each adjacent phoneme in each phoneme or each position in the sentence. As such, since the phonemic environment, such as the adjacent phoneme name or the position in the sentence, in addition to the phoneme type is used as the attribute information to calculate the category frequency, it is possible to determine the converted phoneme category in detail and appropriately add the converted duration length.

The duration length generation data generating module 305 generates duration length generation data 235 which is used to generate duration length by the duration length generating module 231 (see FIG. 29) of the prosody generating module 44 in the speech synthesis module 306, based on the duration length set generated by the duration length set generating module 304. The duration length generating module 231 of the speech synthesis module 306 can use a duration length estimating method based on a sum-of-product model. In this case, the coefficient of the sum-of-product model is the duration length generation data 235. The duration length generation data 235 stores speech synthesis data which is used for speech synthesis by the speech synthesis module 306 in the duration length generation data storage 310.

In the sum-of-product model, data is modeled as the product sum of an attribute prediction model, as represented by the following Expression (24). Then, prediction is performed by the sum of the products, using $a_{km}$ corresponding to each category of an input attribute as a coefficient:

$$y = \sum_k \prod_m a_{km}\delta(k, m) \tag{24}$$

$$\delta(k, m) = \begin{cases} 1 & \text{corresponding to category } m \text{ of attribute } k \\ 0 & \text{others} \end{cases}$$

The duration length generation data generating module 305 calculates training data for duration length and the coefficient am such that the error of the estimation result by the product-sum model is minimized and uses them as the duration length generation data 235.

The speech synthesis module 306 generates synthesized speech corresponding to the input text using the duration length generation data 235 generated by the duration length generation data generating module 305. Specifically, in the speech synthesis module 306, the text analysis module 43 illustrated in FIG. 4 processes the input text and the duration length generating module 231 (see FIG. 29) of the prosody generating module 44 generates duration length using the duration length generation data 235 generated by the duration length generation data generating module 305. Then, the generated duration length is transmitted to the fundamental frequency pattern selection module 232 (see FIG. 29) and the fundamental frequency sequence is generated. The waveform generating module 45 generates a waveform using the fundamental frequency sequence. In this way, the synthesized speech is generated. The duration length generating module 231 of the prosody generating module 44 can estimate the duration length using the above-mentioned Expression (24).

As described in detail above, the speech synthesis device according to the third example generates the duration length generation data based on the duration length set obtained by adding the converted duration length and the target duration length, generates the fundamental frequency sequence based on the duration length which is generated using the duration length generation data, and inputs the fundamental frequency sequence to the waveform generating module 45, thereby generating synthesized speech corresponding to an arbitrary input sentence. Therefore, according to the speech synthesis device of the third example, it is possible to generate the duration length generation data with high coverages using the converted duration length while reproducing the features of the target duration length and generate synthesized speech. It is possible to obtain high-quality synthesized speech with high similarity to a target uttered voice from a small amount of target duration length.

In the above-mentioned third example, in order to increase the rate at which the target duration length is used during speech synthesis, the converted phoneme category is determined based on the frequency and only the converted duration length corresponding to the converted phoneme category is added to the target duration length to generate the duration length set. However, the invention is not limited thereto. For example, when the duration length set including all of the converted duration length and the target duration length is generated and the duration length generation data is generated on the duration length set, in the calculation of the errors of sum-of-product model training, weights may be set such that the weight of the target duration length is more than the weight of the converted duration length and weighted training may be performed to generate the duration length generation data.

In the above-mentioned third example, the converted duration length adding module 323 of the duration length set generating module 304 adds the converted duration length corresponding to the converted phoneme category determined by the converted phoneme category determining module 322 among the converted duration lengths generated by the duration length conversion module 303 to the target duration length to generate the duration length set. However, first, after the converted phoneme category determining module 322 determines the converted phoneme category, the duration length conversion module 303 may convert the conversion source duration length corresponding to the converted phoneme category to generate the converted duration length and the converted duration length adding module 323 may add the converted duration length to the target duration length to generate the duration length set. In this way, it is possible to increase the processing speed, as compared to a case in which all of the conversion source duration lengths are converted in advance.

When the speech synthesis device performs speech synthesis based on unit selection, the generation of the speech waveform by the first example, the generation of the fundamental frequency sequence by the second example, and the generation of the duration length by the third example may be combined with each other. In this way, it is possible to accurately reproduce the features of the target uttered voice with both the prosody and the speech waveform of the synthesized speech and obtain high-quality synthesized speech with high similarity to the target uttered voice. In the second example and the third example, the fundamental frequency pattern code book and the offset prediction are used to generate the fundamental frequency sequence and the duration length is generated by the sum-of-product model. However, the technical idea of this embodiment may be applied to any method which generates data (fundamental frequency sequence generation data and duration length generation data) used to generate the prosody of the synthesized speech based on training using the fundamental frequency sequence set or the duration length set.

FOURTH EXAMPLE

A speech synthesis device according to a fourth example generates synthesized speech using speech synthesis based on an HMM (hidden Markov model) which is a statistical model. In the speech synthesis based on the HMM, feature parameters obtained by analyzing an uttered voice are used to train the HMM, a speech parameter corresponding to arbitrary input text is generated using the obtained HMM, sound source information and a filter coefficient are calculated from the generated speech parameter, and a filtering process is performed to generate the speech waveform of the synthesized speech.

Figure 34:
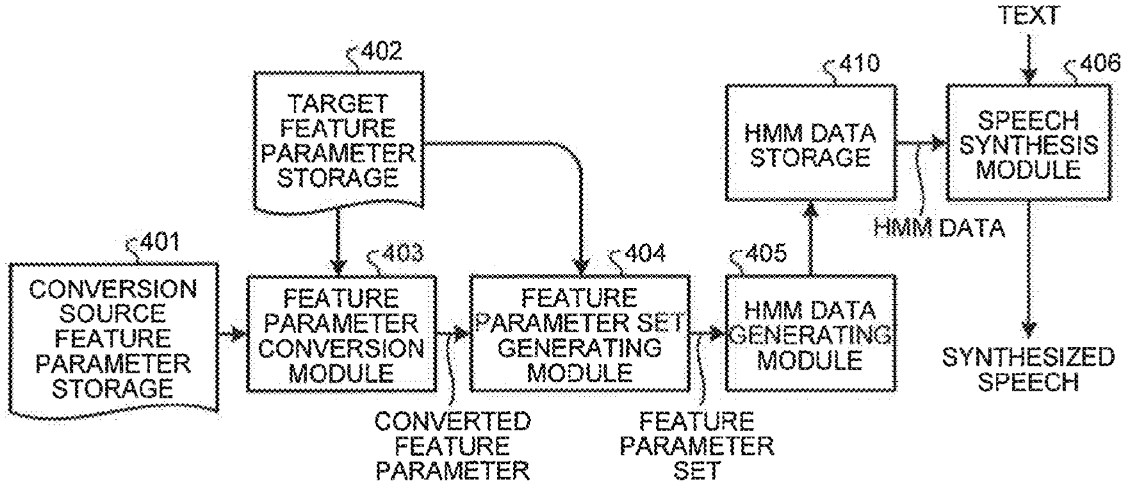
FIG. 34 is a block diagram illustrating a speech synthesis device according to a fourth example.

FIG. 34 is a block diagram illustrating the speech synthesis device according to the fourth example. As illustrated in FIG. 34, the speech synthesis device according to the fourth example includes a conversion source feature parameter storage (second storage) 401, a target feature parameter storage (first storage) 402, a feature parameter conversion module (first generator) 403, a feature parameter set generating module (second generator) 404, an HMM data generating module (third generator) 405, an HMM data storage 410, and a speech synthesis module (fourth generator) 406.

The conversion source feature parameter storage 401 stores feature parameters (conversion source feature parameters) obtained from an arbitrary uttered voice, a context label indicating, for example, the boundary of each speech unit or grammatical attribute information, and attribute information, such as the number of morae of an accentual phrase included in each speech unit, an accent type, an accentual phrase type, and the name of a phoneme included in each speech unit.

The target feature parameter storage 402 stores feature parameters (target feature parameters) obtained from a target uttered voice, the context label indicating, for example, the boundary of each speech unit or grammatical attribute information, and the attribute information, such as the number of morae of the accentual phrase included in each speech unit, the accent type, the accentual phrase type, and the name of the phoneme included in each speech unit.

The feature parameters are used to generate a speech waveform in HMM speech synthesis and include a vocal track parameter for generating spectral information and a sound source parameter for generating excitation source information. The vocal track parameter is a spectrum parameter sequence indicating vocal track information. A parameter, such as mel-LSP or mel-cepstrum, may be used as the vocal track parameter. The sound source parameter is for generating the excitation source information and a fundamental frequency sequence and a band noise intensity sequence may be used as the sound source parameter. The band noise intensity sequence is calculated from the percentage of a noise component in each predetermined band of the voice spectrum. An uttered voice may be divided into a periodic component and a non-periodic component, spectral analysis may be performed, and the band noise intensity sequence may be calculated from the percentage of the non-periodic component. As the feature parameters, these parameters and the dynamic feature value thereof are simultaneously used for HMM training.

Figures 35A, 35B, 35C, 35D:
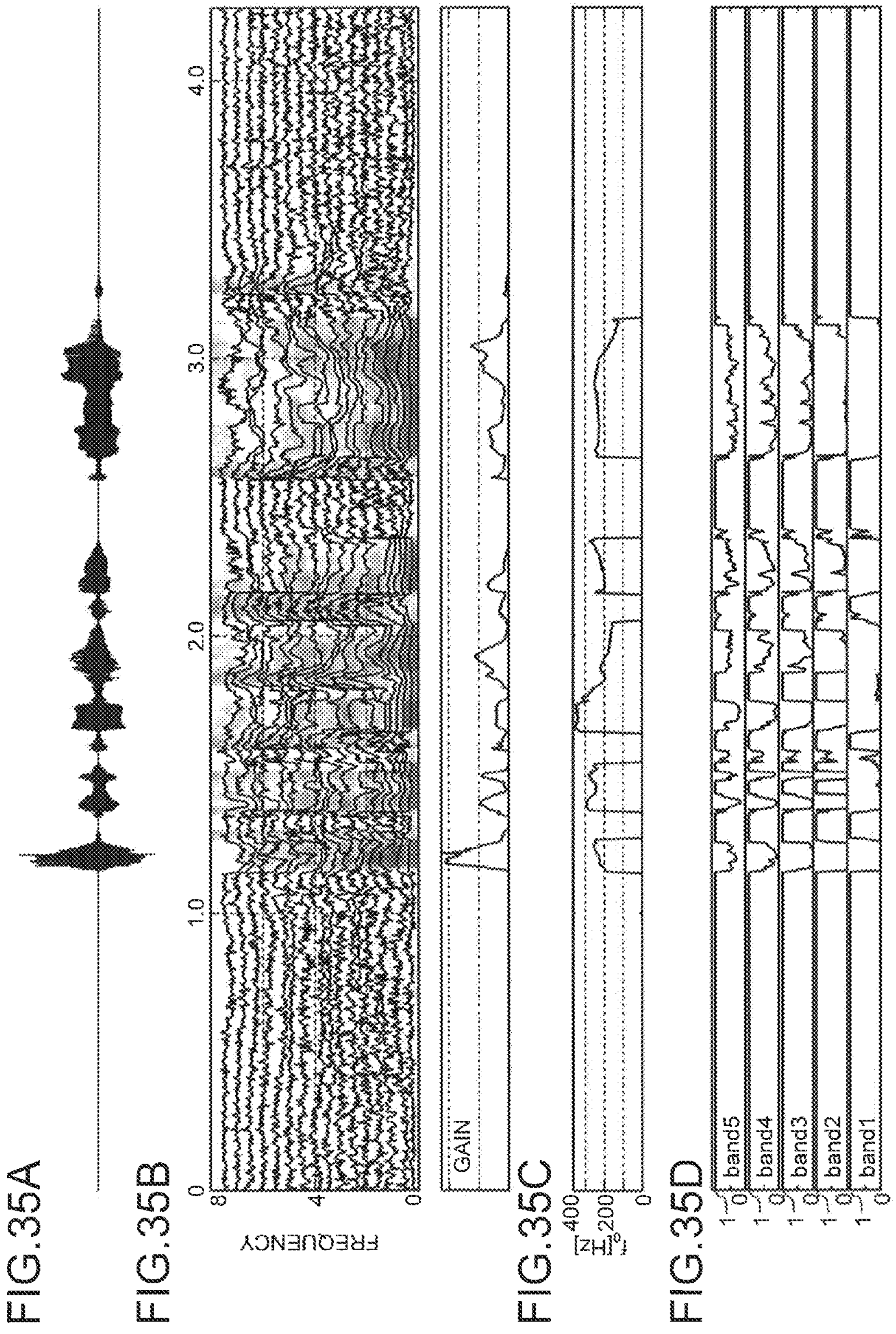
FIGS. 35A to 35D are diagrams illustrating an example of feature parameters.

FIGS. 35A to 35D are diagrams illustrating an example of the feature parameters. FIG. 35A illustrates the speech waveform of an uttered voice, FIG. 35B illustrates a mel-LSP parameter sequence obtained from the uttered voice illustrated in FIG. 35A, FIG. 35C illustrates a fundamental frequency sequence obtained from the uttered voice illustrated in FIG. 35A, and FIG. 35D illustrates a band noise intensity sequence obtained from the uttered voice illustrated in FIG. 35A.

Figure 39:
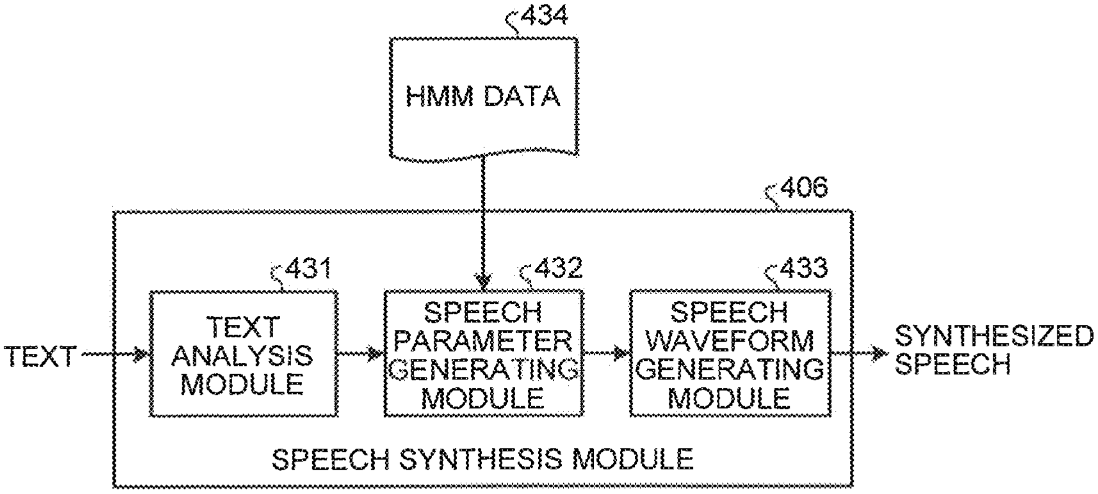
FIG. 39 is a block diagram illustrating an example of a speech synthesis module.

In the mel-LSP parameter sequence illustrated in FIG. 35B, 39-order parameters and a gain are calculated from a spectrum obtained by interpolating the spectrum calculated by pitch synchronous analysis with a fixed frame rate. The fundamental frequency sequence illustrated in FIG. 35C indicates the fundamental frequency of the uttered voice at each point of time. In the band noise intensity sequence illustrated in FIG. 35D, the percentage of a noise component is extracted from each of five divided bands and the band noise intensity sequence is calculated as a parameter with a fixed frame rate. As such, for each frame of the uttered voice, a mel-LSP parameter $c_t$, a band intensity parameter $b_t$, and a fundamental frequency $f_t$ are calculated and arranged as a feature parameter O, and the feature parameter O is stored in the target feature parameter storage 402 and the conversion source feature parameter storage 401. That is, the feature parameter O stored in the target feature parameter storage 402 and the conversion source feature parameter storage 401 can be represented by the following Expression (25):

$$O=(o_1, o_2, \ldots, o_T), o_t=(c'_t, b'_t, f'_t)' \quad (25)$$

FIG. 36 illustrates an example of the feature parameter and the attribute information stored in the target feature parameter storage 402 and the conversion source feature parameter storage 401. The target feature parameter storage 402 and the conversion source feature parameter storage 401 store the feature parameter O, a context label L, a phoneme sequence "phone", a mora number sequence "nmorae", an accent type sequence "accType", and an accentual phrase type sequence "accPhraseType".

The context label L includes a {preceding, relevant, following} phoneme for each phoneme included in the uttered voice, the syllable position of the phoneme in a word, the {preceding, relevant, following} part of speech, the number of syllables in a {preceding, relevant, following} word, the number of syllables from an accent syllable, the position of a word in a sentence, the presence or absence of pause before and after, the number of syllables in a {preceding, relevant, following} breath group, the position of the breath group, the number of syllables of a sentence, or phoneme context information including some of the above-mentioned information items. The context label L is used for HMM training. In addition, the context label L may include time information about a phoneme boundary. The phoneme sequence "phone" is an array of information about phonemes, the mora number sequence "nmorae" is an array of information about the number of morae in each accentual phrase, the accent type sequence "accType" is an array of information the accent type, and the accentual phrase type sequence "accPhraseType" is an array of information about the accentual phrase type. For example, for an uttered voice "kyoo-wa-yoi-tenki-desu", the phoneme sequence L is {ky, o, o, w, a, pau, y, o, i, t, e, N, k, i, d, e, su}, the mora number sequence "nmorae" is (3, 2, 5), the accent type sequence "accType" is {1, 1, 1}, and the accentual phrase type sequence "accPhraseType" is {HEAD, MID, TAIL}. The context label L is an array of phoneme context information about the sentence.

The feature parameter conversion module 403 converts the conversion source feature parameter to generate a converted feature parameter. For the spectrum parameter and band noise intensity, conversion based on the GMM represented by the above-mentioned Expression (7) can be applied to the conversion of the feature parameter. For the fundamental frequency sequence or the phoneme duration length, histogram conversion represented by the above-mentioned Expression (18) or conversion by the average and standard deviation represented by the above-mentioned Expression (19) can be applied to the conversion of the feature parameter.

Figure 37:
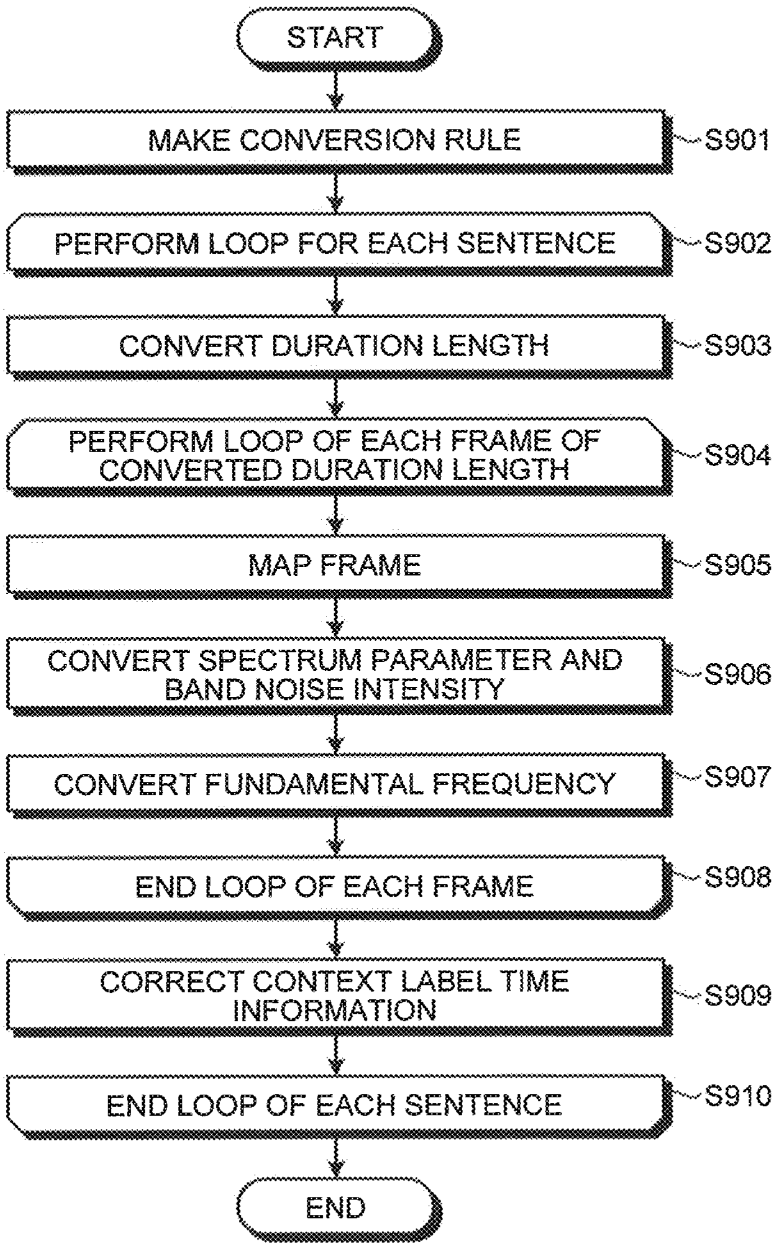
FIG. 37 is a flowchart illustrating the process performed in a feature parameter conversion module.

FIG. 37 is a flowchart illustrating the process performed in the feature parameter conversion module 403. As illustrated in FIG. 37, first, in Step S901, the feature parameter conversion module 403 makes a conversion rule for converting each feature value included in the conversion source feature parameter. Then, the feature parameter conversion module 403 performs a loop from Step S902 to Step S910 in each sentence unit.

In the loop process in the sentence unit, first, in Step S903, the feature parameter conversion module 403 converts duration length. In addition, in order to generate the feature parameter according to the converted duration length, a loop from Step S904 to Step S908 is performed in a frame unit.

In the loop process in the frame unit, in Step S905, the feature parameter conversion module 403 associates the frame of a conversion source with the frame of a conversion destination so as to be matched with the converted duration length. For example, the feature parameter conversion module 403 can linearly map a frame position so as to be associated. Then, in Step S906, the feature parameter conversion module 403 converts the spectrum parameter and the band noise intensity of the associated conversion source frame using the above-mentioned Expression (7). Then, in Step S907, the feature parameter conversion module 403 converts the fundamental frequency. The fundamental frequency of the associated conversion source frame is converted by the above-mentioned Expression (18) or the above-mentioned Expression (19).

After the above-mentioned process, in Step S909, when the context label includes time information, the feature parameter conversion module 403 corrects the time information in correspondence with the converted duration length and generates a converted feature parameter and a context label.

The feature parameter set generating module 404 adds the converted feature parameter generated by the feature parameter conversion module 403 and the target feature parameter stored in the target feature parameter storage 402 to generate a feature parameter set including the target feature parameter and the converted feature parameter.

The feature parameter set generating module 404 may add all of the converted feature parameters generated by the feature parameter conversion module 403 and the target feature parameter to generate the feature parameter set, or it may add some of the converted feature parameters to the target feature parameter to generate the feature parameter set.

Figure 38:
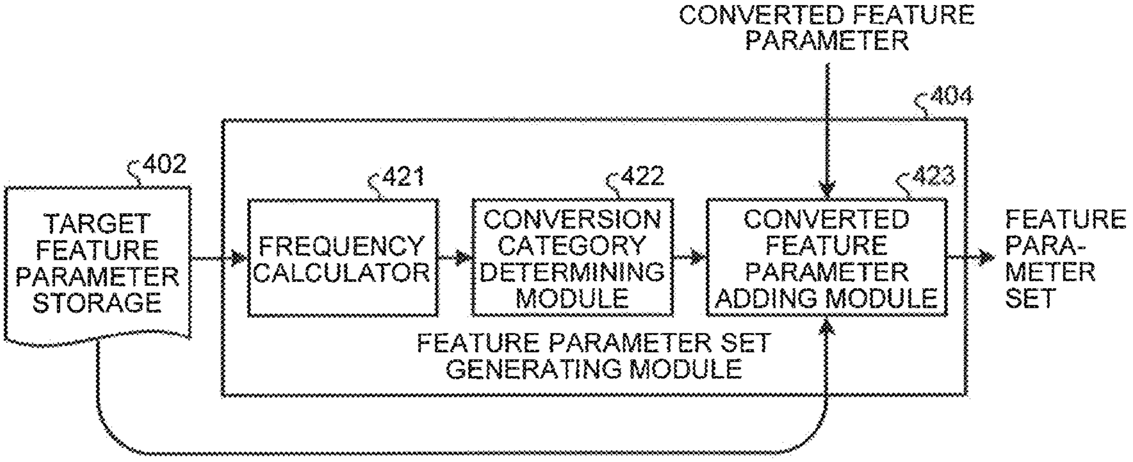
FIG. 38 is a block diagram illustrating an example of a feature parameter set generating module.

FIG. 38 is a block diagram illustrating an example of the feature parameter set generating module 404 which adds some of the converted feature parameters to the target feature parameter to generate the feature parameter set. As illustrated in FIG. 38, the feature parameter set generating module 404 includes a frequency calculator (calculator) 421, a conversion category determining module (determining module) 422, and a converted feature parameter adding module (adding module) 423.

The frequency calculator 421 classifies the target feature parameters stored in the target feature parameter storage 402 into a plurality of categories using a phoneme and accentual phrase type, an accent type, and number of morae which are attribute information, calculates the number of target feature parameters in each category, and calculates a category frequency. The classification of the categories is not limited to classification using a phoneme as a unit. For example, the target feature parameters may be classified in a triphone unit, which is a combination of a phoneme and an adjacent phoneme, and the category frequency may be calculated.

The conversion category determining module 422 determines a conversion category, which is the category of the converted feature parameter to be added to the target feature parameter, based on the category frequency calculated by the frequency calculator 421. For example, a method which determines a category with a category frequency less than a predetermined value to be the conversion category may be used to determine the conversion category.

The converted feature parameter adding module 423 adds the converted feature parameter corresponding to the conversion category determined by the conversion category determining module 422 to the target feature parameter to generate the feature parameter set. That is, a phoneme corresponding to the category frequency or a converted feature parameter corresponding to a sentence including the accentual phrase type, the accent type, and the number of morae is added to the target feature parameter to create the feature parameter set.

The converted feature parameter adding module 423 does not add the converted feature parameters of the entire sentence to the target feature parameter, but it may cut out only the converted feature parameters in a section corresponding to the determined conversion category and add the converted feature parameters. In this case, the feature parameter in a section corresponding to a specific attribute among the converted feature parameters selected based on the category frequency is extracted, only the context label in the corresponding range is extracted, and the time information thereof is corrected so as to correspond to the cutout section, thereby creating the converted feature parameter and the context label in the section to be added. A plurality of conversion feature parameters before and after the corresponding section may be added at the same time. As the section to be added, any unit, such as a phoneme, a syllable, a word, an accentual phrase, a breath group, or a sentence, may be used. The converted feature parameter adding module 423 generates the feature parameter set through the above-mentioned process.

The HMM data generating module 405 generates HMM data which is used by the speech synthesis module 406 to generate synthesized speech, based on the feature parameter set generated by the feature parameter set generating module 404. The HMM data generating module 405 performs HMM training using the feature parameter included in the feature parameter set, the dynamic feature value thereof, and the context label to which attribute information used to construct the decision tree is given. Training is performed by HMM training for each phoneme, context-dependent HMM training, state clustering based on the decision tree using the MDL standard for each stream, and a process of estimating the maximum likelihood of each model. The HMM data generating module 405 stores the obtained decision tree and Gaussian distribution in the HMM data storage 410. In addition, the HMM data generating module 405 also trains a distribution indicating the duration length of each state at the same time, performs decision tree clustering, and stores the distribution and decision tree in the HMM data storage 410. The HMM data, which is speech synthesis data used for speech synthesis by the speech synthesis module 406 is generated and stored in the HMM data storage 410 by the above-mentioned process.

The speech synthesis module 406 generates synthesized speech corresponding to the input text using the HMM data generated by the HMM data generating module 405.

FIG. 39 is a block diagram illustrating an example of the structure of the speech synthesis module 406. As illustrated in FIG. 39, the speech synthesis module 406 includes a text analysis module 431, a speech parameter generating module 432, and a speech waveform generating module 433. The text analysis module 431 has the same structure as the text analysis module 43 of the speech synthesis module 16 and performs a process of analyzing a morpheme from the input text to obtain language information used for speech synthesis, such as reading or accent.

The speech parameter generating module 432 performs a process of generating parameters from HMM data 434 stored in the HMM data storage 410. The HMM data 434 is a model which is generated by the HMM data generating module 405 in advance. The speech parameter generating module 432 generates speech parameters using the model.

Specifically, the speech parameter generating module 432 constructs the HMM of each sentence according to the phoneme sequence or accent information sequence obtained from the analysis result of the language. The HMM of each sentence is constructed by concatenating and arranging the HMMs of phonemes. As the HMM, a model created by performing decision tree clustering for each state and stream can be used. The speech parameter generating module 432 traces the decision tree according to the input attribute information, creates phoneme models using the distribution of leaf nodes as the distribution of each state of the HMM, and arranges the phoneme models to generate a sentence HMM. The speech parameter generating module 432 generates speech parameters from the output probability parameters of the generated sentence HMM. That is, the speech parameter generating module 432 determines the number of frames corresponding to each state from a model of the duration length distribution of each state of the HMM and generates the speech parameters of each frame. A generation algorithm that considers a dynamic feature value during the generation of the speech parameters is used to generate the speech parameters which are smoothly concatenated.

The speech waveform generating module 433 generates the speech waveform of the synthesized speech from the speech parameters generated by the speech parameter generating module 432. Here, the speech waveform generating module 433 generates a mixed sound source from a band noise intensity sequence, a fundamental frequency sequence, and a vocal track parameter sequence and applies a filter corresponding to the spectrum parameter to generate the waveform.

As described above, the HMM data storage 410 stores the HMM data 434 which is trained in the HMM data generating module 405. As described above, the HMM data 434 is generated based on the feature parameter set obtained by adding the target feature parameter and the converted feature parameter.

In this example, the HMM is described as a phoneme unit. However, in addition to the phoneme, a half phoneme obtained by dividing a phoneme or a unit including several phonemes, such as a syllable, may be used. The HMM is a statistical model having several states and includes the output distribution of each state and a state transition probability indicating the probability of state transition.

Figure 40:
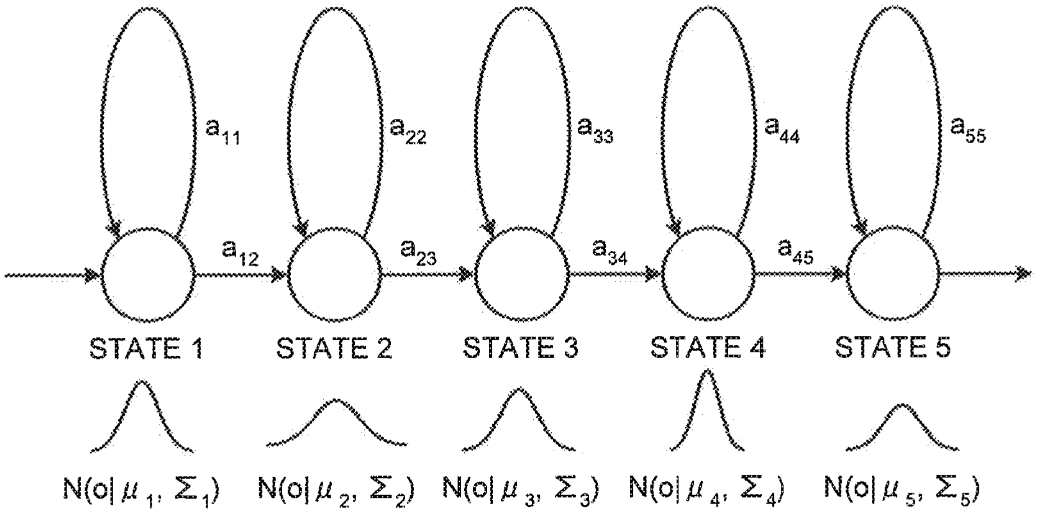
FIG. 40 is a diagram illustrating an example of an HMM.

As illustrated in FIG. 40, a left-right HMM is a type of HMM in which only a transition from a left state to a right state and a self-transition can occur and is used to model time-series information, such as speech. FIG. 40 illustrates a 5-state model in which the state transition probability from a state i to a state j is represented by $a_{ij}$ and the output distribution based on the Gaussian distribution is represented by $N(o|\mu_s, \Sigma_s)$. In the HMM data storage 410, the HMMs are stored as the HMM data 434. However, the Gaussian distribution of each state is stored in the state shared by a decision tree.

Figure 41:
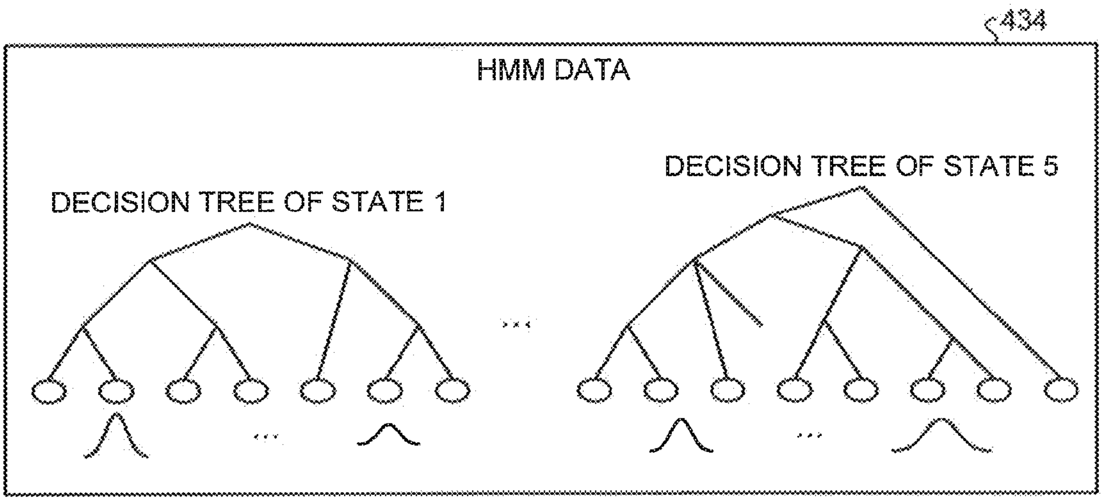
FIG. 41 is a diagram illustrating an example of a decision tree of the HMM.

FIG. 41 is a diagram illustrating an example of the decision tree of the HMM. As illustrated in FIG. 41, the decision tree of each state of the HMM is stored as the HMM data 434, and the Gaussian distribution is held at a leaf node. A question to select a child node based on the phoneme or grammatical attributes is held at each node of the decision tree. As the question, for example, the following questions are stored: "Is the central phoneme a voiced sound?"; "Is the number of phonemes from the beginning of a sentence 1?"; "Is the distance from the accent core 1?"; "Is the phoneme a vowel?"; and "Is the left phoneme 'a'?". The distribution can be selected by tracing the decision tree based on a phoneme sequence or language information obtained by the text analysis module 431.

The decision tree can be formed for each stream of the feature parameter. As the feature parameter, training data O represented by the following Expression (26) is used:

$$O=(o_1, o_2, \ldots, o_T)$$

$$o_t=(c'_t, \Delta c'_t, \Delta^2 c'_t, b'_t, \Delta b'_t, \Delta^2 b'_t, f'_t, \Delta f'_t, \Delta^2 f'_t)' \quad (26)$$

A frame $o_t$ of O at a time t includes a spectrum parameter $c_t$, a band noise intensity parameter $b_t$, and a fundamental frequency parameter $f_t$, Δ is attached to a delta parameter indicating a dynamic feature, and $\Delta^2$ is attached to a second-order Δ parameter. The fundamental frequency is represented as a value indicating an unvoiced sound in an unvoiced sound frame. The HMM can be trained from training data in which a voiced sound and an unvoiced sound are mixed by the HMM based on the probability distribution on a multi-space.

The stream refers to some extracted feature parameters, such as $(c'_t, \Delta c'_t, \Delta^2 c'_t)$, $(b'_t, \Delta b'_t, \Delta^2 b'_t)$, and $(f'_t, \Delta f'_t, \Delta^2 f'_t)$. The decision tree for each stream means that there are a decision tree indicating a spectrum parameter, a decision tree for a band noise intensity parameter b, and a decision tree for a fundamental frequency parameter f. In this case, during speech synthesis, based on the input phoneme sequence and grammatical attributes, each Gaussian distribution is determined through the decision tree of each state of the HMM and the Gaussian distributions are combined to generate the output distribution, thereby generating the HMM.

Figure 42:
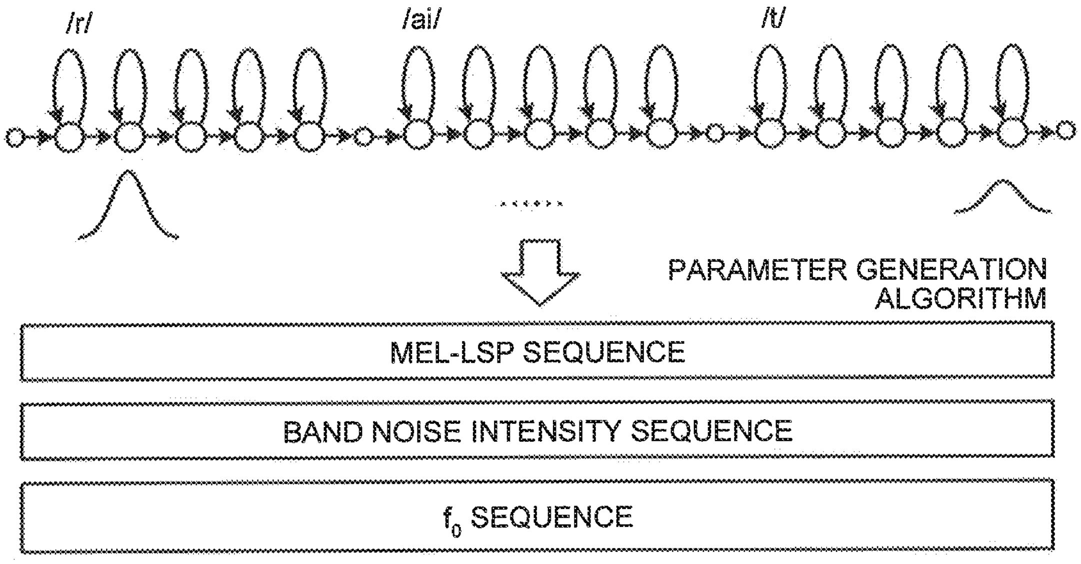
FIG. 42 is a diagram illustrating the outline of a process of generating a speech parameter from the HMM.

FIG. 42 is a diagram illustrating the outline of a process of generating the speech parameters from the HMM. As illustrated in FIG. 42, for example, when synthesized speech "right (r•ai•t)" is generated, the HMMs of each phoneme are concatenated to generate the entire HMM, and speech parameters are generated from the output distribution of each state of the HNM. The output distribution of each state of the HMM is selected from the decision tree which is stored at the HMM data 434. The speech parameters are generated from the average vector and covariance matrix. The speech parameters can be generated by a parameter generation algorithm based on the dynamic feature value. However, other algorithms that generate the parameters from the output distribution of the HMM, such as the linear interpolation or spline interpolation of the average vector, may also be used.

By the above process, a sequence (mel-LSP sequence) of the vocal tract filter for a synthesized sentence, a band noise intensity sequence, and a sequence of speech parameters based on the fundamental frequency ($f_o$) sequence are generated.

The speech waveform generating module 433 applies a mixed excitation source generation process and a filtering process to the generated speech parameters to obtain the speech waveform of the synthesized speech.

Figure 43:
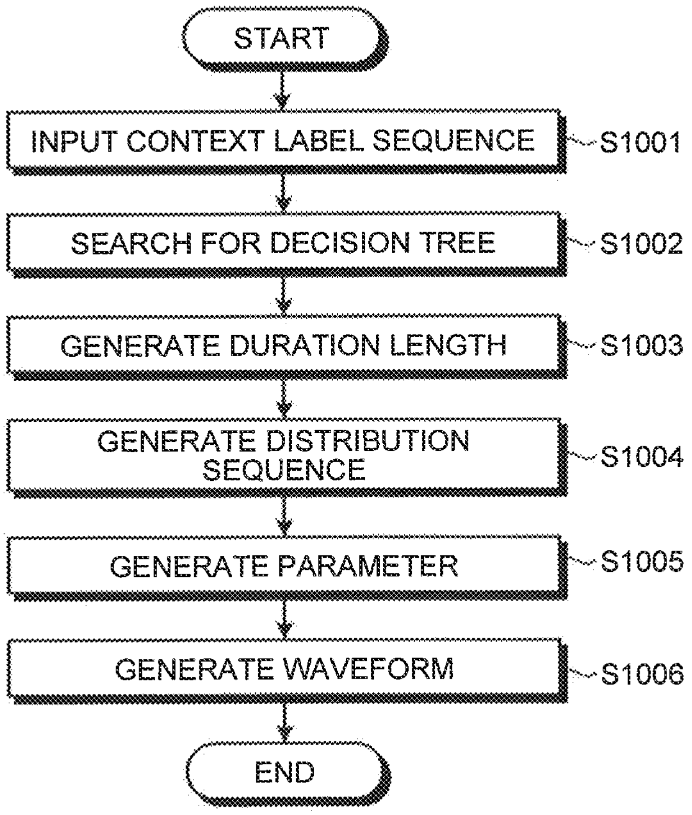
FIG. 43 is a flowchart illustrating the process performed in the speech synthesis module.

FIG. 43 is a flowchart illustrating the process performed in the speech synthesis module 406. In the flowchart illustrated in FIG. 43, the process performed by the text analysis module 431 is omitted and only the processes performed by the speech parameter generating module 432 and the speech waveform generating module 433 are illustrated.

First, in Step S1001, the speech parameter generating module 432 receives the context label sequence obtained from the analysis result of the language by the text analysis module 431. Then, in Step S1002, the speech parameter generating module 432 searches for the decision tree stored in the HMM data storage 410 as the HMM data 434 and generates a state duration length model and an HMM model. Then, in Step S1003, the speech parameter generating module 432 determines the duration length for each state. In Step S1004, the speech parameter generating module 432 generates the distribution sequences of the vocal track parameters, band noise intensity, and fundamental frequency of the entire sentence according to the duration length. Then, in Step S1005, the speech parameter generating module 432 generates parameters from each distribution sequence generated in Step S1004 and obtains a parameter sequence corresponding to a desired sentence. Then, in Step S1006, the speech waveform generating module 433 generates a waveform from the parameters obtained in Step S1005 and generates synthesized speech.

As described in detail above, the speech synthesis device according to the fourth example generates the HMM data based on the feature parameter set obtained by adding the converted feature parameter and the target feature parameter and the speech synthesis module 406 generates the speech parameter using the HMM data. In this way, speech synthesis device generates synthesized speech corresponding to an arbitrary input sentence. Therefore, according to the speech synthesis device of the fourth example, it is possible to generate the HMM data with high coverages using the converted feature parameter, while reproducing the features of the target feature parameter and generate synthesized speech. It is possible to obtain high-quality synthesized speech with high similarity to a target uttered voice from a small number of target feature parameters.

In the above-mentioned fourth example, as the conversion rule for converting the conversion source feature parameter, the voice conversion based on the GMM and the fundamental frequency and duration length conversion based on the histogram or average and standard deviation are applied. However, the invention is not limited thereto. For example, the HMM and a CMLLR (Constrained Maximum Likelihood Linear Regression) method may be used to generate the conversion rule. In this case, a target HMM model is generated from the target feature parameter and a regression matrix for CMLLR is calculated from the conversion source feature parameter and the target HMM model. In CMLLR, a linear conversion matrix for bring feature data close to a target model is calculated based on a likelihood maximization standard. When the linear conversion matrix is applied to the conversion source feature parameter, the feature parameter conversion module 403 can convert the conversion source feature parameter. However, the conversion rule is not limited to CMLLR, but any conversion rule for bring data close to the target model may be applied. In addition, any conversion method may be used which brings the conversion source feature parameter close to the target feature parameter.

In the above-mentioned fourth example, in order to increase the rate at which the target feature parameter is used during speech synthesis, the converted category is determined based on the frequency and only the converted feature parameter corresponding to the converted category is added to the target feature parameter to generate the feature parameter set. However, the invention is not limited thereto. For example, the following method may be used: a feature parameter set including all of the converted feature parameters and the target feature parameter is generated; when the HMM data generating module 405 generates the HMM data based on the feature parameter set during the training of the HMM, weights are set such that the weight of the target feature parameter is more than that of the converted feature parameter; and weighted training is performed to generate the HMM data.

In the above-mentioned fourth example, the converted feature parameter adding module 423 of the feature parameter set generating module 404 adds the converted feature parameter corresponding to the conversion category determined by the conversion category determining module 422 among the converted feature parameters generated by the feature parameter conversion module 403 to the target feature parameter to generate the feature parameter set. However, first, after the conversion category determining module 422 determines the conversion category, the feature parameter conversion module 403 may convert the conversion source feature parameter corresponding to the conversion category to generates a converted feature parameter and the converted feature parameter adding module 423 may add the converted feature parameter to the target feature parameter to generate the feature parameter set. In this way, it is possible to increase the processing speed, as compared to a case in which the conversion source feature parameters are all converted in advance.

The invention has been described in detail above with reference to the examples. As described above, according to the speech synthesis device of this embodiment, it is possible to generate synthesized speech with high similarity to a target uttered voice.

The speech synthesis device according to this embodiment can be implemented by using, for example, a general-purpose computer as basic hardware. That is, a process provided in the general-purpose computer can execute a program to implement the speech synthesis device according to this embodiment. In this case, the speech synthesis device may be implemented by installing the program in the computer in advance. Alternatively, the speech synthesis device may be implemented by storing the program in a storage medium, such as a CD-ROM, or distributing the program through a network and then appropriately installing the program in the computer. In addition, in order to implement the speech synthesis device, the program may be executed on a server computer and a client computer may receive the execution result through the network.

In addition, for example, a storage medium, such as memory, a hard disk, CD-R, CD-RW, DVD-RAM, or DVD-R which is provided inside or outside the computer, may be appropriately used to implement the speech synthesis device. For example, the storage medium may be appropriately used to implement the conversion source voice data storage 11 or the target voice data storage 12 provided in the speech synthesis device according to this embodiment.

The program executed by the speech synthesis device according to this embodiment has a module configuration including each processing unit (for example, the voice data conversion module 13, the voice data set generating module 14, the speech synthesis data generating module 15, and the speech synthesis module 16) of the speech synthesis device. As the actual hardware, for example, a processor reads the program from the storage medium and executes the program. Then, each of the above-mentioned modules is loaded onto the main memory and is then generated on the main memory.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A speech synthesis device comprising:

a first storage configured to store therein first information obtained from a target uttered voice together with attribute information thereof;

a second storage configured to store therein second information obtained from an arbitrary uttered voice together with attribute information thereof;

a first generator configured to generate third information by converting the second information so as to be close to a target voice quality or prosody;

a second generator configured to generate an information set including the first information and the third information;

a third generator configured to generate fourth information used to generate a synthesized speech, based on the information set; and a fourth generator configured to generate the synthesized speech corresponding to input text using the fourth information, where the second generator generates the information set by adding the first information and a portion of the third information, the portion of the third information being selected so as to improve coverages for each attribute of the information set based on the attribute information.

2. The device according to claim 1, wherein the second generator includes:

a calculator configured to classify the first information into a plurality of categories based on the attribute information and calculate, for each category, a category frequency, which is the frequency or the number of first information pieces;

a determining module configured to determine a category of the third information to be added to the first information based on the category frequency; and an adding module configured to add the third information corresponding to the determined category to the first information to generate the information set.

3. The device according to claim 2, wherein the determining module determines, as the category of the third information to be added to the first information, a category with the category frequency less than a predetermined value.

4. The device according to claim 2, wherein the first generator converts the second information corresponding to the category determined by the determining module to generate the third information, and the adding module adds the third information generated by the first generator to the first information to generate the information set.

5. The device according to claim 2, further comprising:

a category presenting module configured to present the category determined by the determining module to a user.

6. The device according to claim 1, wherein the third generator performs a weighting process such that a weight of the first information included in the information set is more than a weight of the third information included in the information set, to generate the fourth information.

7. The device according to claim 1, wherein the fourth generator preferentially uses the first information over the third information to generate the synthesized speech.

8. The device according to claim 1, wherein the first information and the second information are speech units which are generated by dividing a speech waveform of an uttered voice into synthesis units, the information set is a speech unit set including a speech unit which is obtained from a target uttered voice and a speech unit which is obtained by converting a speech unit obtained from an arbitrary uttered voice so as to be close to the target voice quality, and the third generator generates, as the fourth information, a speech unit database which is used to generate a waveform of the synthesized speech, based on the speech unit set.

9. The device according to claim 1, wherein the first information and the second information are fundamental frequency sequences of each accentual phrase of an uttered voice, the information set is a fundamental frequency sequence set including a fundamental frequency sequence which is obtained from the target uttered voice and a fundamental frequency sequence which is obtained by converting a fundamental frequency sequence obtained from the arbitrary uttered voice so as to be close to the target prosody, and the third generator generates, as the fourth information, fundamental frequency sequence generation data used to generate the fundamental frequency sequence of the synthesized speech, based on the fundamental frequency sequence set.

10. The device according to claim 1, wherein each of the first information and the second information is a duration length of a phoneme included in an uttered voice, the information set is a duration length set including the duration length of a phoneme included in the target uttered voice and a duration length which is obtained by converting the duration length of a phoneme included in the arbitrary uttered voice so as to be close to the target prosody, and the third generator generates, as the fourth information, duration length generation data used to generate the duration length of a phoneme included in the synthesized speech, based on the duration length set.

11. The device according to claim 1, wherein each of the first information and the second information is a feature parameter including at least one of a spectrum parameter sequence, a fundamental frequency sequence, and a band noise intensity sequence, the information set is a feature parameter set including a feature parameter which is obtained from the target uttered voice and a feature parameter which is obtained by converting a feature parameter obtained from the arbitrary uttered voice so as to be close to the target voice quality or prosody, and the third generator generates, as the fourth information, HMM (hidden Markov model) data used to generate the synthesized speech, based on the feature parameter set.

12. A speech synthesis method that is performed in a speech synthesis device including a first storage that stores therein first information obtained from a target uttered voice together with attribute information thereof and a second storage that stores therein second information obtained from an arbitrary uttered voice together with attribute information thereof, comprising:

generating third information by converting the second information so as to be close to a target voice quality or prosody;

generating an information set including the first information and the third information by and the first information and a portion of the third information, the portion of the third information being selected so as to improve coverages for each attribute of he information set based on the attribute information;

generating fourth information used to generate a synthesized speech, based on the information set; and generating the synthesized speech corresponding to input text using the fourth information.

13. A computer program product comprising a tangible computer-readable medium containing a program that causes a compute, which includes a first storage that stores first information obtained from a target uttered voice together with attribute information thereof and a second storage that stores second information obtained from an arbitrary uttered voice together with attribute information thereof, to execute:

generating third information by converting the second information so as to be close to a target voice quality or prosody;

generating an information set including the first information and the third information by adding the first information and a portion of the third information, the portion of the third information being selected so as to improve coverages for each attribute of the information set based on the attribute information;

generating fourth information used to generate a synthesized speech, based on the information set; and generating the synthesized speech corresponding to input text using the fourth information.

14. The device according to claim 1, wherein the portion of the third information, which is selected so as to improve coverages for each attribute of the information set based on the attribute information, corresponds to an attribute which is insufficient in the first information.

15. The method according to claim 12, wherein the step of generating the information set further includes:

classifying the first information into a plurality of categories based on the attribute information and calculating, for each category, a category frequency, which is the frequency or the number of first information pieces;

determining a category of the third information to be added to the first information based on the category frequency; and adding the third information corresponding to the determined category to the first information to generate the information set.

16. The computer program product according to claim 13, wherein generating the information set further includes:

classifying the first information into a plurality of categories based on the attribute information and calculating, for each category, a category frequency, which is the frequency or the number of first information pieces;

determining a category of the third information to be added to the first information based on the category frequency; and adding the third information corresponding to the determined category to the first information to generate the information set.

* * * * *